United States Patent
Verreault

(12) 
(10) Patent No.: US 6,434,169 B1
(45) Date of Patent: Aug. 13, 2002

(54) VOICEBAND/MODEM SIGNAL RELAY

(75) Inventor: Eric Verreault, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 08/962,174

(22) Filed: Oct. 31, 1997

(51) Int. Cl.⁷ .................... H04L 12/28; H04L 29/08; H04M 11/00; H04M 1/57
(52) U.S. Cl. .................. 370/522; 370/401; 370/474; 370/395; 379/100.17; 379/93.14
(58) Field of Search .................. 370/522, 110, 370/32.1, 76, 86, 81, 401, 474, 463, 465; 379/100, 93, 99, 97, 142; 358/257, 256

(56) References Cited

U.S. PATENT DOCUMENTS

| | | | | |
|---|---|---|---|---|
| 5,117,453 A | * | 5/1992 | Plasecki et al. | 379/100 |
| 5,353,280 A | * | 10/1994 | Ungerbock | 370/32.1 |
| 5,455,859 A | * | 10/1995 | Gutzmer | 379/442 |
| 5,473,676 A | * | 12/1995 | Frick et al. | 379/99 |
| 5,600,712 A | * | 2/1997 | Hanson et al. | 379/142 |
| 5,625,677 A | * | 4/1997 | Fiertag et al. | 379/93 |
| 5,625,679 A | * | 4/1997 | Gutzmer | 379/99 |
| 5,732,104 A | * | 3/1998 | Brown et al. | 375/222 |

* cited by examiner

*Primary Examiner*—Wellington Chin
*Assistant Examiner*—M. Phan
(74) *Attorney, Agent, or Firm*—Marks & Clerk

(57) ABSTRACT

A relay device associated with each end point modem in a data communication network provides a system for transporting data over a communication channel employing voice compression. Each relay device exchanges relevant parameter information with its associated modem and with each other in order to negotiate compatible data transfer conditions. The protocol exchange between each relay and its associated modem will typically include the calculation of inter-loop delay values for echo cancellation and line probing for line equalization or bandwidth optimization. Supported data rates, modulation type and encoding information is also exchanged. The invention provides a system for full duplex transmission of data over modems while saving on bandwidth because of voice compression techniques.

17 Claims, 8 Drawing Sheets

VOICEBAND/MODEM SIGNAL RELAY

FIELD OF THE INVENTION

This invention relates to data communications over the Public Switched Telephone Network (PSTN) and more particularly to modem relay devices operating in conjunction with end user modems to permit full duplex exchange of data over voice compressed communications channels.

BACKGROUND

Telephone calls over a communication channel using voice compression provides for greater bandwidth utilization. Uncompressed pulse code modulated (PCM) voice circuits require the full 64 kb/s bandwidth for voice communications. Utilizing voice compression, the PCM rate can be reduced substantially without appreciably affecting voice quality. Standard voice compression techniques can reduce the PCM rate to 16 kb/s or below. This, of course, results in a better utilization of the 64 kb/s bandwidth which is of particular importance to telephone companies and private enterprises that lease bandwidth from service providers.

Attempts to carry voiceband signals, such as those originating from a fax or modem, over a voice compressed channel results in severe compatibility problems. Obviously, a fax or modem operating at 14.4 kb/s cannot send data over a channel which has been voice compressed to 16 kb/s because the voice compression cannot accurately duplicate the voiceband signal. To overcome this limitation voice compressed channels traditionally employ a secondary system to demodulate and remodulate voiceband signals. For example, when a fax or modem call is initiated a protocol signature is detected and the system stops its operation of compressing the voice and goes into a mode of demodulating and remodulating the voiceband signal. Further, voiceband relay systems as discussed above use a piping approach where the demodulated signal sent out from the near end is reproduced as is at the receiving end.

In half duplex fax calls wherein the hand-shaking protocol is conducted sequentially, echo does not create significant impediments. In full duplex modem calls such as those supported by V.32 ITU and V.34 ITU standards, a ranging operation is conducted as part of their initial protocol exchange. This ranging operation allows the two interconnected modems to calculate the round trip delay of the in-between path and this permits a configuration of the far end echo canceller in order to remove or at least significantly reduce the echo component. Echo components in voice communications are annoying but can be tolerated whereas in data communications they make the system unusable. Line probing is also performed to measure the transfer characteristics of the analog loop.

In a telecommunications system such as might be used by a commercial establishment wherein a PBX is used to connect into the network at the near end and at the far end of the connection a further PBX receives the communication for connection to the end user. If the demodulated signal from the PBX is reproduced as is at the far end PBX, the distance between the near end modem and near end PBX as well as the distance between the near end PBX and far end PBX and the far end PBX and far end modem are not taken into consideration. As a result, the round trip delay is not properly calculated and the modem far end echo canceller cannot operate successfully. In order to make this type of system work effectively the distances between the modem and the PBX must be kept to a minimum to limit the echo within the modem near end echo canceller. This, of course, is not acceptable in most commercial establishments.

The present invention overcomes the aforementioned limitations by incorporating a modem relay in association with the system manager or PBX. The system manager might be, for example, a Newbridge Networks 3600 MainStreet bandwidth manager. The modem relay is configured to exchange parameter information with its associated modem upon detection of the initiation of a modem call. The parameter information includes round trip delay between the modem relay and its associated modem. Other parameter information such as supported data rate, modulation type and encoding algorithm is exchanged. The near end modem relay relays this information to its counterpart modem relay at the receiving end, which, in turn, exchanges parameter information with the designated far end modem. The respective modem relays and modems arrive at compatible parameters and this information is relayed between modem relays such that common transmission characteristics are established. The round trip delay information caused by the two local loops is used to properly configure the echo cancellers. The line probing is also properly performed because the relay modem interacts with its associated modem in a local loop. It is also within the control of the modem relays to not only convey supported parameters but also modify them so as to match the capabilities of the system. For example, if the voice compression uses a bandwidth of 8 kb/s and the modems have agreed on a capability of 14.4 kb/s, the relay can make sure that the information conveyed between modems will not show any data rate above 8 kb/s.

SUMMARY OF THE INVENTION

It is an object of the present invention to provide a communications system which permits modem calls over a voice-compressed channel in the Public Switched Telephone Network.

Therefore, in accordance with a first broad aspect of the present invention there is provided in a communications network for transporting data between end point terminals over a communication channel employing voice compression a relay device associated with each end point terminal. Each of the relay devices have means to exchange parameter information with its associated end point terminal and means to relay the parameter information to its counterpart relay device, and to receive parameter information from its counterpart relay device for the purpose of negotiating compatible data transmission conditions.

In accordance with a preferred embodiment the end point terminal is customer premise equipment having voice and data capabilities.

In accordance with a second broad aspect of the present invention, there is provided a method of communicating data from a near end modem to a far end modem over a voice compressed communications channel comprising: providing a modemrelay associated with each modem; configuring each modem relay to exchange parameter information with its associated modem and configuring each modem relay to relay the parameter information to its counterpart modem relay in order to negotiate compatible data transmission conditions.

BRIEF DESCRIPTION OF THE DRAWINGS

The invention will now be described in greater detail with reference to the attached drawings wherein.

DETAILED DESCRIPTION OF THE INVENTION

Figure 1:
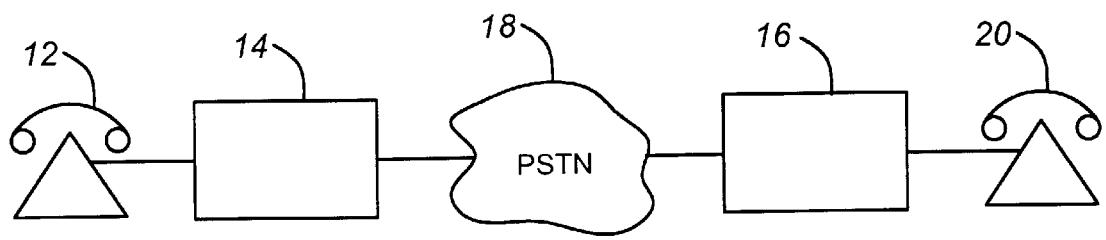
FIG. 1 is a high-level block diagram of a prior art voice compression system.

FIG. 1 illustrates a voice compression technique as taught in the prior art. As shown, telephone 12, which may have an associated modem or Fax machine, connects to node 14, which includes voice to data detection, a voice compression system, and demodulating/re-modulating circuits. Node 14 is connected to far end node 16 via network 18 which is, for example, the PSTN. Node 16 provides similar functionality as node 14. Node 16 is connected to far end terminal 20. A voice conversation between terminals 12 and 20 is compressed from the PCM 64 kb/s rate to some lower rate such as 16 kb/s depending on the application.

Upon receipt of a protocol signature from terminal 12, node 14 in the prior art system switches off the voice compression and switches on the demodulating circuit whereby the demodulated voiceband signal is carried through on the PSTN to node 16 at a PCM rate of 64 kb/s. Node 16 re-modulates the voice band signal for delivery to telephone/modem 20. Obviously, this prior art system does not offer any bandwidth savings for voiceband signals.

Figure 2:
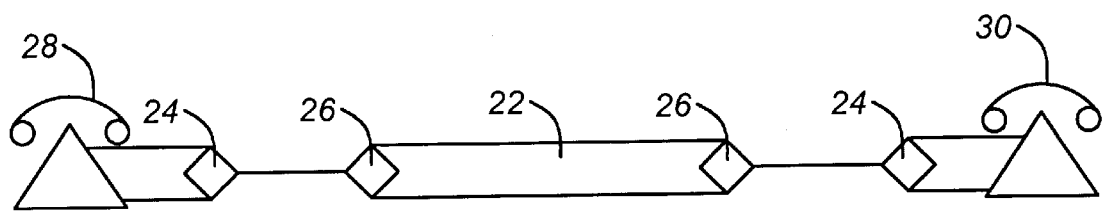
FIG. 2 is a high-level block diagram of a prior art communication system for modem calls.

FIG. 2 relates to a system for providing full duplex modem calls through the network 22. Because full duplex communication leads to returned echoes due to system elements i.e. 4 wire to 2 wire relays 24, 26, the round trip delay between end points 28, 30 must be known. In the system of FIG. 2 (which does not employ voice compression) call set up protocol establishes the round trip delay and can thereby configure system echo cancellers (not shown) appropriately.

Figure 3:
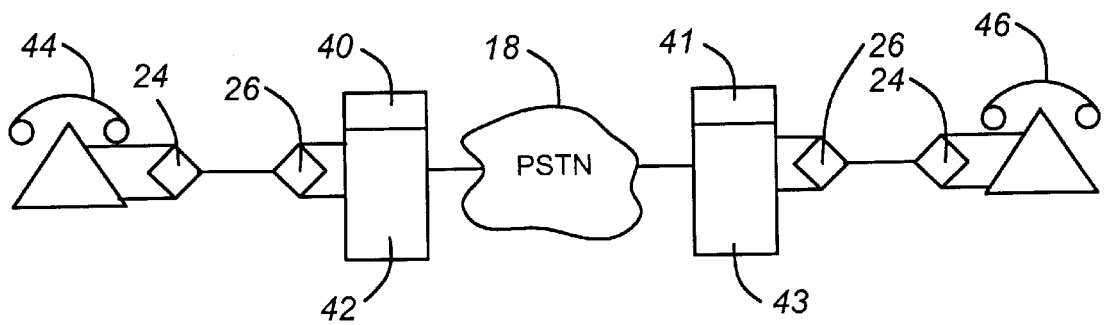
FIG. 3 is a high-level block diagram of the voice band/modem signal relay system according to the present invention.

FIG. 3 is a high-level diagram of the system of the present invention. In this system modem relays 40, 41 are associated with bandwidth manager 42, 43 as shown at either side of the PSTN 18. Bandwidth manager 42 may be one of Newbridge's 3600 MainStreet series of products and accessories. Modem relay 40 is connected to a near end terminal 44 which, as known, can provide for voice communication or data communication from a modem/computer terminal (not shown). At the opposite end of the network modem relay 41 via manager 43 is connected to a terminal 46 which is similar to terminal 44. Managers 42, 43 in addition to the modem relay will support such functionality as voice compression; echo cancellation; switch from voice to data detection; modulation/demodulation; switching etc. In a preferred implementation, managers 42, 43 serve as a PBX for an enterprise network. In this implementation, manager 42, 43 provide switching and other functionality to a plurality of terminals 44, 46 within each premise served by the system. It will be appreciated that the premise or area supported by each manager or PBX may be substantial whereby the distance between relay 40, 41 and terminals 44, 46 is significant and certainly not constant.

According to the invention relays 40, 41 exchange parameter information with terminals 44, 46 respectively upon detection of a switch from voice to data at either end of the network. For example, when terminal 44 initiates a modem call, relay 40 exchanges parameter information with terminal 44 to ascertain a common set of parameters such as supported data rate, modulator type and encoding. The modem relay 40 also advises relay 41 that a data call is being directed to terminal 46. Relay 41 and terminal 46 then exchange parameter information and select a set of conditions supported by both. Upon completion of this exchange, the two relays 40, 41 arrive at a set of conditions that can be supported by both modems taking into account the voice compression PCM rate employed by the network. Thus, for example, if modem 44 can operate a 14.4 kb/s but relay 40 only supports 12 kb/s, while modem 44 can operate at 28.8 kb/s and relay 41 supports 14.4 kbbb/s, the two relays will agree on a rate of 12 kb/s. If, however, the voice compression rate is only 8 kb/s this minimum will be indicated by relays 40 and 41 during the exchange.

Additionally, the round trip loop delay between each modem and its associated modem relay is calculated using protocol transitional information. This round trip delay information is used in providing accurate estimates of the system echo so that the echo cancellers can be properly configured. The exact same measurement procedure applies to the evaluation of the local loop characteristics.

Figure 4:
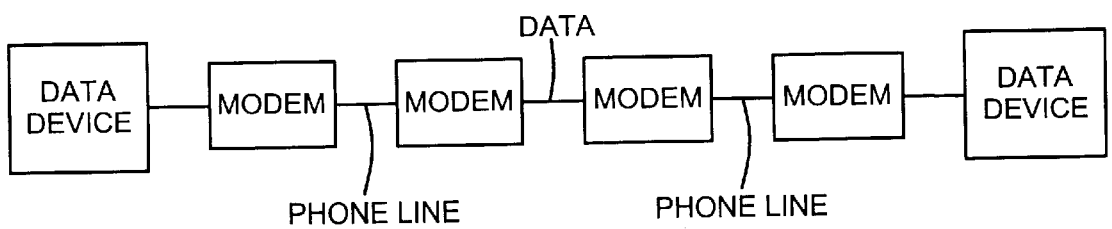
FIG. 4 is a diagram illustrating the two local loop equivalent circuit.

In effect the modems and relays at each end of the system create two local loops as shown in FIG. 4.

The following provides a detailed description of one implementation of the present invention herein known as the nData V.32 modem relay protocol state machine.

This description defines the interface to, and the workings of, the nData V.32 modem relay state machine.

The modem relay module uses a V.32 bis software modem. It also uses the modem controller interface and the nData access functions design to facilitate the communication with the modem software. This implies that the state machine software must follow the requirements of these modules. Furthermore, all the requirements of CPU usage, RAM, etc., required by these modules must be respected restricting the amount of MIPs, RAM available for the modem relay software.

The AC15, echo suppressor and super-tandem are assumed to be turned off at this point (i.e when switching to data mode). The EC is left in the state it was in before switching to data mode and must be handled properly by the nData application to enable it, and to start and stop the adaptation when necessary. The modem relay state machine assumes that a voice detector has already detected a certain amount of preamble sequence (either AA or AC) and that some delay is required for switching before it enters the first V.32 state machine. The amount of constant delay introduced should be kept to a minimum and for that reason the network layer is placed in HS mode with a small packet size of 15 msec.

It can only work with double buffering size of 10 msec or less.

This module should also be designed to be multi-channel compatible meaning that all necessary memory should be in a structure.

The timer resolution should also be taken in account by the module; this resolution is dependent of the task switch iteration.

The nData V.32 modem relay state machine is designed to run on the TMS320C51 DSP. It is assumed that no internal RAM is available and that the software stack will also be in external memory. The TMS320C51 has eight levels of hardware stack and four of them are in used or reserved for interrupts and the voice kernel, this limits the V.32 modem relay state machine software to use up to a maximum of four levels of hardware stack. For this reason, hardware stack level(s) will be saved and restored from the software stack when necessary. The amount of external program memory used by the module should be as small as possible, the external data space usage should be moderate and the number of MIPs should also be minimum since the software modem requires the bulk of the processing power.

The design here is to be a V.32, V.32 bis modem relay application. This implies that the rate sequence from the near end must be sent to the remote end before the near end transmits the rate sequence to the external modem. Other messages are also exchanged between the two ends for data exchange and status information. FIGS. 8a–8d and 9 give a global view of the modem relay.

A distinct database of type V32Dta must exist for each nData stream supporting the V.32 bis modem relay. The structure and description of this database follows in table 1:

TABLE 1

| V.32 Modem Relay Database | |
|---|---|
| V32Dta | Description |
| CurrentState | Address of the current state to run by the FSA |
| NbParam | Number of arguments in the FSA list (2) |
| Param1 | FSA argument #1 (pointer to nDataCDta) |
| Param2 | FSA argument #2 (pointer to V32Dta, this structure) |
| Mode | variable used to indicate how the smodem is cfg |
| DataMsgTx | Flag to indicate if a message was transmitted (DATA_START) |

TABLE 1-continued

| V.32 Modem Relay Database | |
|---|---|
| V32Dta | Description |
| FlagMsgRx | Flag to indicate if a message is received |
| MaskR | Modified Rate sequence (R1 or R2) |
| R3 | R3 rate sequence received from the modem or from a messag |
| E | Final rate configuration receive from modem (receiver cfg |
| V32RateMask | V32 rate sequence mask to apply to removed unsupported sp |
| V32bRateMask | V32 bis rate sequence mask to apply to removed unsupporte speed(s) |
| FinSpeed | Final speed used by software modem (n*800 bps) |
| FinMode | Final mode used by software modem |
| RoundTrip | Round Trip Delay estimation (in number of samples) |
| OptQsizeM128T | Optimal Queue size minus 128T (B1) |
| OptQLevel | Optimal Queue size of the modem controller |
| *PktSizeTbl | Table defining the packet size (ModemMaxRate words) |
| PktSize | Remote end Packet Size |
| RemVersion | Remote end Version ID |
| *outWorkBufPtr | Pointer to temporary storage buffer ( ) used by Depacketi and Copy2ModemTxBuff |
| *tmpBufPtr | Pointer to temporary storage buffer (MAX_QBUF_SIZE) used Queue fonctions (GetQ) |

In addition to the V.32 modem relay specific database, the V.32 modem relay state machine as do all nData state machines requires a per stream database of type nDataCDta The protocols supported by the modem relay application are V.32 and V.32 bis excluding some functionality listed in table 2. These are excluded since they are not supported by the software modem at the moment. Other features aren't supported by the software modem but they are not required by the relay application.

TABLE 2

| List of V.32/V.32 bis unsupported functions | |
|---|---|
| Name | ITU Reference |
| Retrain | Section 5.5 of V.32 |
| Rate Re negotiation | Section 8 of V.32 bis |
| Fall back/fall forward mode | |

The main function of the state machine is to detect and respond to the modulation changes of the V.32 connect sequence. Then once the connect sequence is completed the state machine enters data mode where it has to transfer data between the two ends. In data mode a depacketizing function reads the packets from the network and extracts the data coming from the remote end. The data is modulated and transmitted by the software modem, on the other way demodulated data is pulled out from the software modem buffer, packetized and transmit as a data message to the remote end. For the proper operation of the rate controller (underflow or overflow), the network layer queues must be filled with enough data before entering data mode. The way we acheive this is by sending a lots of Bi until the desired amount of packets have been received. The minimum transmission time of 128T B1 is also taken in account in the numbers of packets required.

The nData V.32 bis modem relay state machine is part of an nData task handling data or message between the two endpoint. The state machine interfaces with the network layer directly via queues or indirectly via the packetizer and depacketizer functions when required. The state machine also interfaces with the software modem through the modem controller and several access functions.

The nData task is called depending on the number of samples it has to process. This currently depends on the type of voice application running before switching. For now, the possibilities are 2.5 msec, 10 msec and 20 msec. The lowest iteration should be used to minimize the jitter of the round trip delay estimation.

Figure 5:
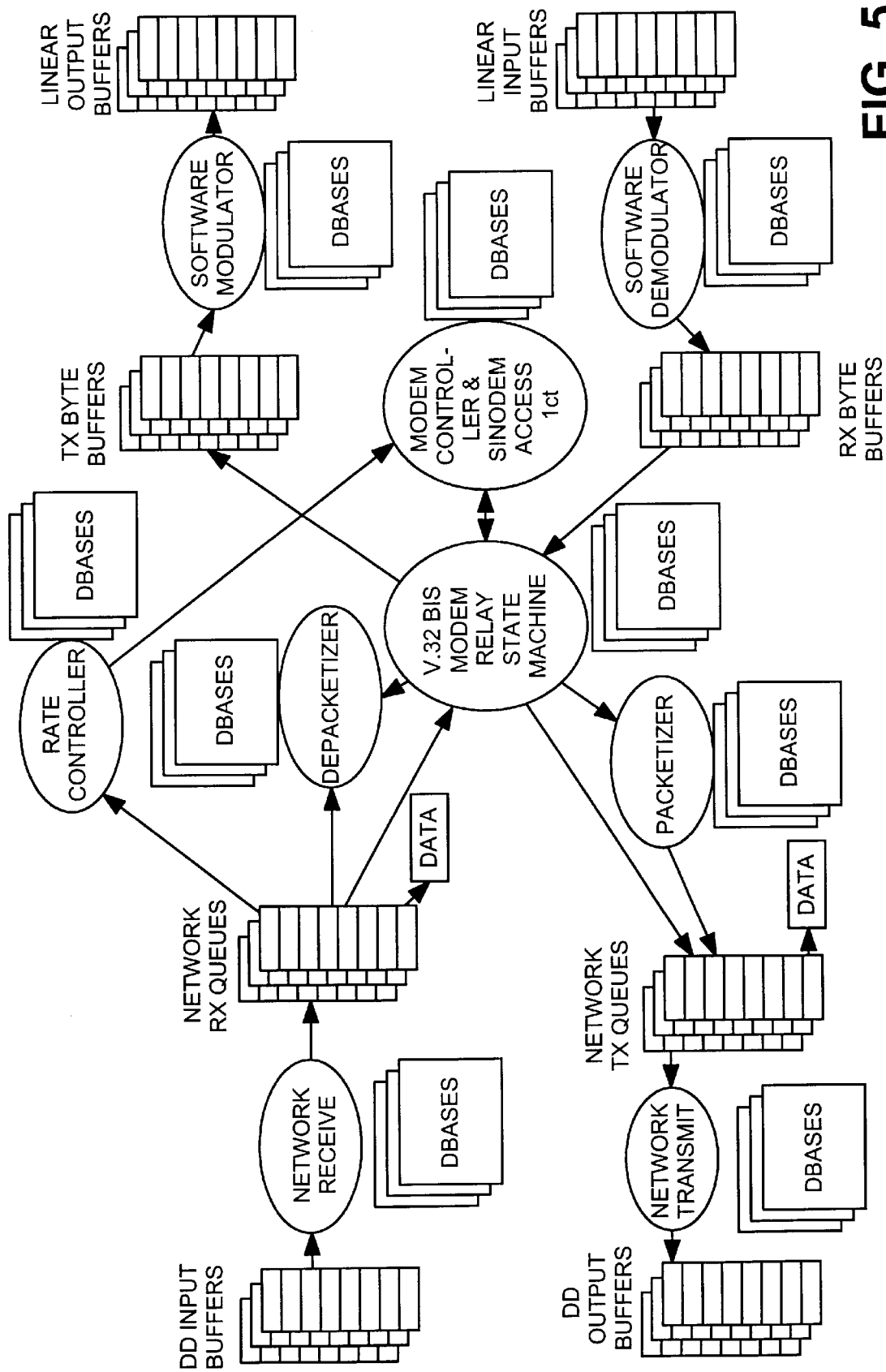
FIG. 5 illustrates a modem relay architecture according to one implementation of the present invention.

FIG. 5 illustrates the v.32 bis modem relay architecture. The processes that make up the V.32 modem relay software are programmed as a state machine. When one of these new processes is called, it is called through the FSA. This in turn calls the appropriate state function. Each function (state) returns an offset that indicates what the next state of that state machine will be run.

The purpose of the automaton is to control the operation of the state machine. Here is the basic procedure that follows the FSA in the V.32 bis modem relay software:

The current state to be executed is determined;
Address of the parameters structures are passed on the stack;
The state is called;
If a state transition is required, the state calls a function to initialize the next state.

The finite state automaton reads a table containing all the information related to the state sequence.

The V.32 state machine is responsible of detecting and generating protocol specific patterns. It is also responsible of interpreting and generating the appropriate NL messages used to inform the other end of a transition occurring in the protocol sequence. The V.32 modem relay application has a common entry function called V32ModemRelay, its main functions are to call the states through the FSA, verify the state sanity timer and transition to the switch to voice in case of timer expiration. The state sanity timer is necessary to make sure that the state machine won't stay locked into a state if an expected event is not occurring. Also where necessary, level(s) of the hardware stack are saved into the software stack to permit required function calls.

This state machine implements the caller and answerer mode modem relay. Two entry points exist for the state machine and the appropriate one is selected depending on the reason of switching set by the voice application and read by the nData task upon entry. These two points are V32CallWaitACDet and V32AnsWaitAADet. The V32AnsWaitAADet is selected when the reason for switching to data mode is that a transitional signalling message is received indicating that the other end has detected the AC pattern or when the voice detector has detected the AA pattern. The V32CallWaitACDet is selected when the reason for switching is that the voice modem detector has detected the AC pattern or when the transitionnal signalling indicates that AA was detected at the other end. These initial states also generates a message indicating their version identification, their mode (V32_CALLER_MODE, V32_ANSWER_MODE) of operation and their packet size configuration. This mode of operation is used to verify if both sides are configured properly i.e. one side must be a caller and the other side must be an answerer. The version identification will be used in the future to identify the remote system and will therefore know what features are supported. The packet size is exchanged to enable both sides to use the lowest packet size.

The state machine state table for both sides, the caller and responder follows as table 3:

TABLE 3

V.32 bis FSA State Table

V32b Modem Relay FSA State Table

| | | |
|---|---|---|
| V32CallWaitACDet | state_name, | V32Wait4Tone |
| | state_init_fu | V32CallWaitACDetInit |
| | next_state1 | V32CallWaitCADet |
| | next_state2 | V32Sw2Voice |
| V32CallWaitCADet | state_name, | V32WaitTrans1 |
| | state_init_fu | V32CallWaitCADetInit |
| | next_state1 | V32CallWaitCCSend |
| | next_state2 | V32CallWaitAC1Det |
| | next_state3 | V32Sw2Voice |
| V32CallWaitCCSend | state_name, | V32Wait4Time |
| | state_init_fu | V32CallWaitCCSendInit |
| | next_state1 | V32CallWaitAC1Det |
| | next_state2 | V32Sw2Voice |
| V32CallWaitAC1Det | state_name, | V32WaitTrans2 |
| | state_init_fu | V32CallWaitAC1DetInit |
| | next_state1 | V32CallWaitR1Det |
| | next_state2 | V32Sw2Voice |
| V32CallWaitR1Det | state_name, | V32WaitRDet |
| | state_init_fu | V32CallWaitR1DetInit |
| | next_state1 | V32CallDelayECStart |
| | next_state2 | V32Sw2Voice |
| V32CallDelayECStart | state_name, | V32Wait4Time |
| | state_init_fu | V32CallDelayECStartInit |
| | next_state1 | V32CallWaitR2Msg |
| | next_state2 | V32Sw2Voice |
| V32CallWaitR2Msg | state_name, | V32WaitRMsg |
| | state_init_fu | V32CallWaitR2DetInit |
| | next_state1 | V32CallWaitR3det |
| | next_state2 | V32Sw2Voice |
| V32CallWaitR3Det | state_name, | V32CallWaitR3DetState |
| | state_init_fu | V32CallWaitR3DetInit |
| | next_state1 | V32CallWaitEDet |
| | next_state2 | V32CallWaitGSTNClearDown |
| | next_state3 | V32Sw2Voice |
| V32CallWaitData | state_name, | V32waitData |
| | state_init_fu | V32CallWaitDataInit |
| | next_state1 | V32DataMode |
| | next_state2 | V32Sw2Voice |
| V32AnsWaitAADet | state_name, | V32Wait4Tone |
| | state_init_fu | V32AnsWaitAADetInit |
| | next_state1 | V32AnsWaitSendAC |
| | next_state2 | V32Sw2Voice |
| V32AnsWaitSendAC | state_name, | V32Wait4Time |
| | state_init_fu | V32AnsWaitACMsgInit |
| | next_state1 | V32AnsWaitCAMsg |
| | next_state2 | V32Sw2Voice |
| V32AnsWaitCCDet | state_name, | V32WaitTrans1 |
| | state_init_fu | V32AnsWaitCCDetInit |
| | next_state1 | V32AnsWaitSendAC1 |
| | next_state2 | V32AnsWaitSilDet |
| | next_state3 | V32Sw2Voice |
| V32AnsWaitSendAC1 | state_name, | V32Wait4Time |
| | state_init_fu | V32AnsWaitAC1MsgInit |
| | next_state1 | V32AnsWaitSilDet |
| | next_state2 | V32Sw2Voice |

TABLE 3-continued

V.32 bis FSA State Table

V32b Modem Relay FSA State Table

| | | |
|---|---|---|
| V32AnsWaitSilDet | state_name, | V32AnsWaitSilDetState |
| | state_init_fu | V32AnsWaitSilDetInit |
| | next_state1 | V32AnsWaitR1Msg |
| | next_state2 | V32Sw2Voice |
| V32AnsWaitR1Msg | state_name, | V32AnsWaitRMsg |
| | state_init_fu | V32AnsWaitR1MsgInit |
| | next_state1 | V32AnsWaitSDet |
| | next_state2 | V32Sw2Voice |
| V32AnsWaitSDet | state_name, | V32AnsWaitSDetState |
| | state_init_fu | V32AnsWaitSDetInit |
| | next_state1 | V32AnsWaitR2Det |
| | next_state2 | V32Sw2Voice |
| V32AnsWaitR2Det | state_name, | V32AnsWaitRDet |
| | state_init_fu | V32AnsWaitR2DetInit |
| | next_state1 | V32AnsWaitR3Msg |
| | next_state2 | V32Sw2Voice |
| V32AnsWaitR3Msg | state_name, | V32AnsWaitR3MsgState |
| | state_init_fu | V32AnsWaitR3MsgInit |
| | next_state1 | V32AnsWaitEDet |
| | next_state2 | V32WaitGSTNClearDown |
| | next_state3 | V32Sw2Voice |
| V32AnsWaitEDet | state_name, | V32AnsWaitEDetState |
| | state_init_fu | V32AnsWaitEDetInit |
| | next_state1 | V32AnsWaitData |
| | next_state2 | V32Sw2Voice |
| V32AnsWaitData | state_name, | V32WaitData |
| | state_init_fu | V32AnsWaitDataInit |
| | next_state1 | V32DataMode |
| | next_state2 | V32Sw2Voice |
| V32DataMode | state_name, | V32DataModeState |
| | state_init_fu | V32DataModeInit |
| | next_state1 | V32DataRxOnly |
| | next_state2 | V32DataTxOnly |
| | next_state3 | V32Sw2Voice |
| V32DataRxOnly | state_name, | V32DataRxOnlyState |
| | state_init_fu | V32DataRxOnlyInit |
| | next_state1 | V32Sw2Voice |
| V32DataTxOnly | state_name, | V32DataTxOnlyState |
| | state_init_fu | V32DataTxOnlyInit |
| | next_state1 | V32Sw2Voice |
| V32GSTNClearDown | state_name, | V32GSTNClearDownState |
| | state_init_fu | V32GSTNClearDownInit |
| | next_state1 | V32Sw2Voice |
| V32Sw2Voice | state_name, | V32Sw2VoiceState |
| | state_init_fu | V32Sw2VoiceInit |
| | next_state1 | N/A |

The V32ModemRelay function is the entry point of the V.32 modem relay state machine. It saves levels of the hardware stack on the software stack (to give more level of functions calls), performs the state sanity timeout verification and calls the FSA. If the state sanity timer expires, a transition to the switch to voice state is requested. The function may have a repeat loop to call the FSA several times if it appears to become necessary.

The pseudo code for this state follows:

```
void V32ModemRelay (*nDataCDta)         ; FSA calling convention
    V32bDta *V32bDtaPtr;
    save hardware stack level on software stack       ; save hw stack to sw stack
    if (nDataCDta->nDataTimers[TIMER1] != 0)
        FSA(&(V32bDtaPtr->CurrentState))
    else                                              ; timer expired!
        RDSEvent(#V32_ERROR, V32_STATE_TIMEOUT)        ; report timeout error
        initFSA(&(V32bDtaPtr->CurrentState), &Sw2VoiceState) ; transition SwitchTOvoice
    endif
    restore hardware stack level from software stack
```

When a switch from voice occurs provoked by the arrival of a transitional signaling message indicating that the remote end has detected the AA pattern or that the local detector has detected AC, the system goes into the V32CallWaitACDetState state. The V32CallWaitACDetState is responsible for starting the transmission of the AA pattern and it waits for the detection of the AC pattern from the software modem. the state also sends the modem information message twice to indicate to the remote end our mode of operation (V32_CALER_MODE, V32_ANSWER_MODE), our current packet size configuration and our system identification. This is done to inform the remote end of some information about this end. For instance, both ends must be configured in the opposite mode and use the same packet size. If both are configured in the same mode of operation a switch to voice is requested. We also have to configure both ends to use the same and lowest packet size. At all time in this state we also verify the reception of a switch to voice message in which case the other end requests a switch to voice. The reception of the modem information message (V32_MODEM_INFO_MSG) is verified in the V32Sw2VoiceMsg ( ) function and the V32CallWaitR2Msg and V32AnsWaitR1Msg states. When the message is received, the mode of operation is compared to switch to voice as soon as possible if they differ and the packet size and system identification written to the database. The packet size configuration is done in the V32CallWaitR3DetInit and in the V32AnsWaitSDetInit. The message is sent twice since it is a data message and we want to make sure that a bad FCS on the first one won't stop the call. The pseudo code for this state follows:

```
Initialization Function:
void V32CallWaitACDetInit (*ParamPtr)                           ; FSA calling convention
    nDataCDta->ProtoFlag = V32__CALL__AC__DET__STATE
    RDSEvent(#V32B__FSA__STATUS, V32__CALL__AC__DET__STATE)     ; Event report state change
    nDataCDta->nDataTimers[TIMER1] = V32__AC__DET__TIMEOUT      ; Start sanity timer
    V32InfoSend(V32Dta, nDataCDta)          ; send modem info msg
    V32InfoSend(V32Dta, nDataCDta)          ; again, send info msg
                                                                ; transmit AA pattern
    ModemControl(nDataCDta->ModemTxPtr, MC__OP__SET__V32__TX__STATE, MC__P1__SEND__AA)
    return
State Code: V32CallWaitACDetState
Uses the state function V32Wait4Tone
```

When the state V32CallWaitACDetState exits because the AC pattern has been detected, the control is transferred to the V32CallWaitCADet state. The V32CallWaitCADet state waits to detect the first phase reversal in the AC pattern (the AC to CA transition). When the phase reversal is detected, a transition to the V32CallWaitCCSend or the V32CallAC1Det is requested. It maybe necessary depending on the double buffer size to wait for a while because there shall be a delay of 64T between the detection of the AC to CA pattern and the next change in the transmitted pattern. The command to start the round trip delay count is also configured at this since it is required by the modem controller to detect the phase reversal and to start counting at that point. At all times in this state we verify the reception of a switch to voice message indicating the other end is going back to voice. We also continuously verify that there is energy at the modem receiver. If a loss of energy is detected, a switch to voice is sent to the remote end and we switch to voice.

The pseudo code for this state follows:

terminals (rx) and the time the transmitted phase reversal is at the line terminals (tx) and is 64+/−2T. This delay has to be the same for all modem types since the transitions are used to estimate the round trip delay and used for far end echo cancellers. In this case the timer count shall be 64T minus the processing delay of detecting the phase reversal and the delay introduce by the buffering (receiving and transmitting buffering). The buffering delay introduced is two times the size of the buffers (doubled buffer) used by nData per call. The jitter of the delay measurement is then the size of the iteration buffer (2.5). We also substract the 2.5 msec jitter to push it. The V32CallWaitCCSend state is there to wait for the expiration of this timer when necessary. Once the timer expires, we start the transmission of the CC pattern, start the measurement of the round trip delay (NT) and request a transition to the V32CallWaitAC1State to wait for the detection of the CA to AC transition. This state could be bypassed if the timer evaluation indicates that it is less or equal to zero. At all time in this state we verify the reception of a switch to voice message indicating the other end is

```
Initialization Function:
void V32CallWaitCADetInit  (*ParamPtr)                          ; FSA calling convention
    nDataCDta->ProtoFlag = V32__CALL__CA__DET__STATE
    RDSEvent(#V32B__FSA__STATUS, V32__CALL__CA__DET__STATE)     ; Event report state change
    nDataCDta->nDataTimers[TIMER1] = V32__CA__DET__TIMEOUT      ; Start sanity timer
    ModemControl(nDataCDta->ModemRxPtr,                         ; Start round trip delay cnt
            MC__OP__SET__V32__RX__CONFIG, MC__P1__START__RT__DELAY)
    return
State Code: V32CallWaitCADetState
Uses the state function V32WaitTrans1
```

Once the incoming transition from AC to CA has been detected, the caller must wait some time before starting to send the CC pattern. This delay is the processing delay required between the received phase reversal at our line going back to voice. We also continuously verify that there is energy at the modem receiver. If a loss of energy is detected, a switch to voice is sent to the remote end and we switch to voice.

The pseudo code for this state follows:

```
Initialization Function:
void V32CallWaitCCSendInit (*ParamPtr)                          ; FSA calling convention
    nDataCDta->ProtoFlag = V32__CALL__CC__SEND___STATE
    RDSEvent(#V32B__FSA__STATUS, V32__CALL__CC__SEND__STATE)    ; Event report state change
    nDataCDta->nDataTimers[TIMER1] = 65535                      ; sanity timer not used
                                                                ; Start timer
    TIMER_2 = V32__TIME__64T - V32__TIME__TRANS1__DET - (2*nDataCDta->NSampPerCall)
            - nDataCDta->NSampPerIteration
    return
```

State Code: V32CallWaitCCSendState
Uses the state function V32Wait4Time

The V32CallWaitAC1Det state is responsible of detecting the second phase reversal in the AC pattern (the CA to AC transition). Once the transition is detected, we will shut off the transmitter. At all time in this state we verify the reception of a switch to voice message indicating the other end is going back to voice. We also continuously verify that there is energy at the modem receiver. If a loss of energy is detected, a switch to voice is sent to the remote end and we switch to voice.

The pseudo code for this state follows:

```
Initialization Function:
void V32CallWaitAC1DetInit (*ParamPtr)                              ; FSA calling convention
    nDatacDta->ProtoFlag = V32_CALL_AC1_DET_STATE
    RDSEvent(#V32B_FSA_STATUS, V32_CALL_AC1_DET_STATE)              ; Event report state change
    nDataCDta->nDataTimers[TIMER1] = V32_AC1_DET_TIMEOUT    ; Start sanity timer
    ModemControl(nDataCDta->ModemTxPtr,                             ; Transmit CC pattern
            MC_OP_SET_V32_TX_STATE, MC_P1_SEND_CC)
    return
State Code: V32CallWaitAC1DetState
Uses the state function V32WaitTrans2
```

The V32CallWaitR1Det state is responsible of detecting the rate sequence R1 from the external modem and starting the transmission of S, SN and TRN. This occurs once the second phase reversal in the AC sequence is detected. We then have to configure our modem to transmit silence and configure our modem receiver to disable its S detector following the. detection of S. This is required at this point since the modem will disable its S detector after the reception of the incoming S from the other modem. The modem S detector is disabled to avoid a false detection of our transmitted S (echo). It must also verify the capabilities of the local end before transmitting the message with the modified rate sequence to the remote end. The maximal rate of the modem capability is verified since it is possible the modem max rate offered by the external modem exceeds the available bandwidth. If the user wants to select a specific mode, it will simply have to configure the external modem. At all times in this state we verify the reception of a switch to voice message indicating the other end is going back to voice. We also continuously verify that there is energy at the modem receiver. If a loss of energy is detected, a switch to voice is sent to the remote end and we switch to voice. This verification of loss of energy is delayed because of the 16T time when the other modem is silent. The waiting delay has to take in account the roundtrip delay (RT), our buffering delay and the jitter in our measurement of the round trip delay. This is why a safety value is added in the waiting delay timer.

The pseudo code for this state follows:

```
Initialization Function:
void V32CallWaitR1DetInit (*ParamPtr)                              ; FSA calling convention
    nDataCDta->ProtoFlag = V32_CALL_R1_DET_STATE
    RDSEvent(#V32B_FSA_STATUS, V32_CALL_R1_DET_STATE)              ; Event report state change
    nDataCDta->nDataTimers[TIMER1] = V32_R1_DET_TIMEOUT            ; Start sanity timer
    ModemControl(nDataCDta->ModemTxPtr,                            ; transmit Silence pattern
            MC_OP_SET_V32_TX_STATE, MC_P1_SEND_SILENCE)
    ModemControl(nDataCDta->ModemRxPtr,                            ; cfg RX for pause of S Det
            MC_OP_SET_V32_RX_CONFIG, MC_P1_CALL_PAUSE0)
    V32bDta->RT = ModemControl(nDataCDta->ModemRxPtr,              ; rd RT, remove the extra
            MC_OP_STATUS_REQ_V32, MC_P1_RX_ROUND_TRIP)  ; and convert to samples
            - 64T - (2*nDataCDta->NSampPerCall)                    ;
    TIMER_2 = V32_TIME_16T + V32bDta->RT + V32_TIME_RT_SAFETY +
                                                                   ; Dont look for energy
            (2*nDataCDta->NSampPerCall)                            ; during the 16T of Silence
    return
State Code: V32CallWaitR1DetState
Uses the state function V32WaitRDet
```

Upon entry in this state, the timer to delay the start of the echo canceller training is started. This timer is necessary since we want to start the echo adaptation when the TRN sequence is started. The delay is the round trip delay (NT of S) plus the 256T of S and 16T of SN since we are not transmitting the note sequence. The transmission of TRN is also delayed by the input and output buffering delay and our value of RT does not include the extra 64T include in NT. The input buffer must also be taken into account since we want the adaptation to be done on a valid buffer.

The pseudo code for this state follows:

```
Initialization Function:
void V32CallDelayECStartInit (*ParamPtr)                        ; FSA calling convention
    nDataCDta->ProtoFlag = V32_CALL_DELAY_EC_STATE
    RDSEvent(#V32B_FSA_STATUS, V32_CALL_DELAY_EC_STATE)   ; Event report state change
    nDataCDta->nDataTimers[TIMER1] = 65535                       ; Sanity timer not used
    ModemControl(nDataCDta->ModemTxPtr,                          ; transmit NT+256 S, SN
        MC_OP_SET_V32_TX_STATE, MC_P1_SEND_XYS_TRN, 0, 256)  ; infinite TRN
    TIMER_2 = V32Dta->RT + V32_TIME_256T + V32_TIME_16T +        ; delay Start of EC after
        V32_TIME_64T + (2*nDataCDta->NSampPerCall)               ; NT of S(RT+64T) 256T of S
    1*nDataCDta->NSampPerIteration          ; and 16T of SN +
                                            ; in/out buffering delay
                                            ; and jitter
    return
State Code: V32CallDelayECStart
Uses the state function V32Wait4Time
```

The V32CallWaitR2Msg state waits for the R2 rate sequence message from the remote end modem and for the echo adaptation to be completed. When received, the rate is read from the message, stored in the database, modified to remove the unsupported capabilities and finally written to the software modem. Writing the rate to the modem also instructs it to send the rate. Because we must make sure the training of the echo canceller is successful, the system must stay in this state for a minimum time, the minimum training time for the EC. The ITU G.165 specs indicates that echo cancellers must train within 650 ms. When the R2 message is received, the echo canceller status is requested. When the adaptation is completed and the minimum amount of TRN is transmitted we transition to the V32CallWaitR2MsgState. Until the echo adaptation is completed and the maximal allowed adaption time is not expired we stay in this state.

Two timers are started in this init state, the first one is the timer used to make sure that we transmit the minimum amount of TRN (1280T) and the other one is the maximal allowed time to train the echo canceller. The init state also start the echo canceller. This involves resetting the taps to zero, zeroing the delay line of the far-end echo canceller and configuring the delay line based on the round trip delay for the far-end echo canceller.

The pseudo code for this state follows:

```
Initialization Function:
void V32CallWaitR2MsgInit (*ParamPtr)                         ; FSA calling convention
    nDataCDta->ProtoFlag = V32_CALL_R2_MSG_STATE
    RDSEvent(#V32B_FSA_STATUS, V32_CALL_R2_MSG_STATE)     ; Event report state change
    nDataCDta->nDataTimers[TIMER1] = V32_R2_MSG_TIMEOUT        ; Start sanity timer
    ECAdaptOn(nDataCDta->stream)                               ; start the EC adaptation
    RDSEvent(#V32_START_EC)                                    ; Report this
    TIMER_2 = V32_TIME_MIN_TRN                                 ; minimal TRN timer
    TIMER_3 = V32_TIME_MAX_TRN + V3Dta->RT + V32_TIME_64T   ; maximal stretch of TRN
        + (2*nDataCDta->NSampPerCall)
    V32Dta->FlagMsgRx = 0                                      ; R2 not received yet
    EC.DelayLine = V32Dta.RoundTrip + (2*nDataCDta->NSampPerCall)
    return
State Code: V32CallWaitR2MsgState
Uses the state function V32WaitRMsg
```

The V32CallWaitR3Det state waits to detect the rate sequence R3 from the external modem. Once the rate sequence R3 is detected, the modem goes into the initiation of the data exchange. The R3 rate indicates the capabilities accepted by both the external modems and is duplicated in the rate sequence E (with different framing bits). It is compared against the GSTN clear down condition. When a cleardown is requested, the system goes to the V32GSTNClearDown state where the transmission will be stopped after 64T. At all times in this state we verify the reception of a switch to voice message indicating the other end is going back to voice. We also continuously verify that there is energy at the modem receiver. If a loss of energy is detected, a switch to voice is sent to the remote end and we switch to voice. This verification of loss of energy is delayed because of the propagation time when the other modem is silent. This delay is the round trip delay as measured previously. The pseudo code for this state follows:

```
Initialization Function:
void V32CallWaitR3DetInit (*ParamPtr)                              ; FSA calling convention
    nDataCDta->ProtoFlag = V32_CALL_R3_DET_STATE
    RDSEvent(#V32B_FSA_STATUS, V32_CALL_R3_DET_STATE)              ; Event report state change
    nDataCDta->nDataTimers[TIMER1] = V32_R3_DET_TIMEOUT            ; Start sanity timer
    ECAdaptOff(nDataCDta->Stream)                                  ; stop the EC adaptation
    RDSEvent(#V32_STOP_EC)
    ModemControl(nDataCDta->ModemTxPtr,                            ; transmit R2 sequence
            MC_OP_SET_V32_TX_STATE, MC_P1_SEND_RATE, V32Dta->R)
    ModemControl(nDataCDta->ModemRxPtr,                            ; CLEAR pause of S Det
            MC_OP_CLR_V32_RX_CONFIG, MC_P1_CALL_PAUSE0)
    TIMER_2 = V32Dta->RT + RT_SAFETY_TIME +                        ; Dont look for energy loss
            (2*nDataCDta->NSampPerCall)                            ;  before arrival of S
    V32CompPktSize(V32Dta, nDataCDta)                              ; compute packet size table
    return
State Code:
nextState V32CallWaitR3DetState (*ParamPtr)                        ; FSA calling convention
    nextState = 0                                                  ; Default,stay in this state
    if (ModemControl(nDataCDta->ModemRxPtr, MC_OP_STATUS_REQ_V32, MC_P1_R3_DET)
        V32bDtaPtr->R3 = ModemControl(nDataCDta->ModemRxPtr,
            MC_OP_STATUS_REQ_V32, MC_P1_RX_RATE_WORD)              ; read rate sequence rx
        if (V32Dta->R3 = V32BIS_RATE)                              ; what type or rate ?
            tmp = (V32Dta->R3 & V32B_GSTN_CLEAR_DOWN)              ; compare with GTSN
            V32Dta.E = V32Dta->R3 | V32_E_BIT_V32B_MASK             ;  create E from R3
        else                                                       ; V32 Rate
            tmp = (V32Dta->R3 & V32_GSTN_CLEAR_DOWN)               ; compare with GSTN
            V32Dta.E = V32Dta->R3 | V32_E_BIT_V32_MASK              ;  create E from R3
        endif
        if (tmp = 0)                                               ; GSTN clear Down request ?
            nextState = 2                                          ;    state GstnClearDown
        else
            convert R3 to speed mode
            RDSEvent(V32_FINAL_CFG_RX, V32Dta->FinSpeed,           ; Report the configuration
                    V32Dta->FinMode)
            nDataRateConfig(nDataCDta->Stream, V32Dta->FinSpeed, 1) ; Cfg NL (efficient)
            StartPacketizer(nDataCDta->Stream, V32_DATA_MSG)
            RDSEvent(V32_RATE_SEQ, V32Dta->R3,                     ; Display both values
                    V32Dta->MaskR3)
            nextState = 1                                          ;    state CallWaitEDet
        endif
    endif
    if (V32Sw2VoiceMsg(nDataCDta))                                 ; check for Sw to voice msg
        nextState = 3                                              ;    state Sw2VoiceMsgRx
    else if ((TIMER_2 = 0) && (!V32IsEnergy(nDataCDta)))            ; check for Energy loss
        nextState = 4                                              ;    state Sw2VoiceLostEnergy
    endif
    return (nextState)
```

The V32CallWaitData state waits to be ready to start the full duplex exchange. We transmit the previously received rate sequence R3, convert the R3 rate sequence into the E sequence and configure the modem transmitter with this converted E with a lot of B1. Then we read the final speed and mode from the modem transmitter to initialize the network and the packetizer. We have to do all this since we are about to received data (demodulate) and may use the packetizer. The state itself waits for the queue to be at the optimal level and for the detection of the E sequence. Once both conditions are met we transition to the V32DataMode state. The state also looks for any demodulated data and will transmit the V32_DATA_START_MSG before packetizing any demodulated data. This is to inform the remote end of the start of demodulation at this end. At all the time we verify the presence of the carrier since a loss of the carrier indicates either loss or corruption of data. The state also looks for the reception of the switch to voice message in which case a transition to the switch to voice state is requested. The pseudo code for this state follows:

```
Initialization Function:
void V32CallWaitDataInit  (*ParamPtr)                              ; FSA calling convention
    nDataCDta->ProtoFlag = V32_WAIT_DATA_STATE
    RDSEvent(#V32B_FSA_STATUS, V32_WAIT_DATA_STATE)    ; Event report state change
    nDataCDta->nDataTimers[TIMER1] = V32_WAIT_DATA_TIMEOUT; Start sanity timer
    PutQ(nDataCDta->NetTxQWrite, #V32_R3_DET_MSG,      ; Send R3
                            16, &(V32Dta->R3))
    PutQ(nDataCDta->NetTxQWrite, #V32_R3_DET_MSG,      ; Send R3 twice
                            16, &(V32Dta->R3))
    ModemControl(nDataCDta->ModemTxPtr,                ; Send E and Xtra long B1
            MC_OP_SET_V32_TX_STATE, MC_P1_SEND_EYB1, V32DtaPtr->E, 32767)
```

-continued

```
    V32Dta->DataMsgFlag = 0                    ; Start MSG not sent yet
State Code: V32CallWaitDataState
Uses the state function V32WaitData
```

The V32AnsWaitAADetstate starts the transmission of the AC pattern and waits for the detection of the AA pattern from the software modem. Once AA is detected, a transition to the V32AnsWaitSendAC is requested a message is sent to the remote end to indicate our mode of operation and the packet size we are going to use.

The pseudo code for this state follows:

```
Initialization Function:
void V32AnsWaitAADetInit (*ParamPtr)                ; FSA calling convention
    nDataCDta->ProtoFlag = V32_ANS_AA_DET_STATE
    RDSEvent(#V32B_FSA_STATUS, V32_ANS_AA_DET_STATE)   ; Event report state change
    nDataCDta->nDataTimers[TIMER1] = V32_AA_DET_TIMEOUT   ; Start sanity timer
                                                          ; transmit AC pattern
    ModemControl(nDataCDta->ModemTxPtr, MC_OP_SET_V32_TX_STATE, MC_P1_SEND_AC)
    return
State Code: V32AnsWaitAADetState
Uses the state function V32Wait4Tone
```

The V32AnsWaitSendAC state waits the expiration of the 256T timer. Once the timer expires, we starts the transmission of the AC pattern, start the measurement of the round trip delay and request a transition to the V32AnsWaitCCDetState. The 256T timer is used to send the minimal amount of AC. The minimal amount of AC is 128T (64T when AA Detected) but it is recommended to transmit at least 256T of AC before generating the first phase reversal. The first implementation had 128T of AC but connection problems were found and it has been suggested to increase it at 256T.

The pseudo code for this state follows:

The V32AnsWaitCCDet is responsible of detecting the AA/cc transition at the receiver and to generate the second phase reversal (transmit AC). We must also configure the receiver to disable its S detector to avoid detecting the echo of the S sequence we will very soon transmit. This is necessary since we are going to transmit an S sequence whose echo could falsely trigger our receiver. The configuration will simply delay the S detector until a safe point. Also at this point the round trip delay (MT) has been estimated and is available for reading.

```
void V32AnsWaitSendACInit (*ParamPtr)                  ; FSA calling convention
    nDataCDta->ProtoFlag = V32_ANS_SEND_AC_STATE
    RDSEvent(#V32B_FSA_STATUS, V32_ANS_SEND_AC_STATE)   ; Event report state change
    TIMER1 = 65535                                      ; sanity timer not used
    TIMER_2 = V32_TIME_256T                             ; need to TX < 128T of AC
    return                                              ; but illico's suggest 256
State Code: V32AnsWaitSendACState (*ParamPtr)
Uses the state function V32Wait4Time
```

The pseudo code for this state follows:

```
void V32AnsWaitCCDetInit (*ParamPtr)                    ; FSA calling convention
    nDataCDta->ProtoFlag = V32_ANS_CC_DET_STATE
    RDSEvent(#V32B_FSA_STATUS, V32_ANS_CC_DET_STATE)    ; Event report state change
    nDataCDta->nDataTimers[TIMER1] = V32_CC_DET_TIMEOUT  ; Start sanity timer
    ModemControl(nDataCDta->ModemTxPtr,                  ; transmit CA pattern
                    MC_OP_SET_V32_TX_STATE, MC_P1_SEND_CA)
    ModemControl(nDataCDta->ModemRxPtr,                  ; start round trip delay cnt
                    MC_OP_SetV32RxConfig, MC_P1_START_RT_DELAY)
```

-continued

```
    return
State Code: V32AnsWaitCCDetState
Uses the state function V32Wait4Trans1
```

Once the incoming transition from AA to CC has been detected, the answerer must wait some time (64T) before starting to send the AC pattern. The reason for this delay is for the processing time of detecting the phase reversal versus the transmission of the phase reversal. We take into account our detection timer plus our buffering time delay as explained in the V32CallWaitCADet state. The V32AnsWaitSendAC1 state is there to wait for the expiration of this timer when necessary. If the timer is not required, this state will be bypassed. The V32AnsWaitCCDet will transition directly to the V32AnsWaitSendAC1 if this timer is not required. Once the timer expires, we start the transmission of the AC pattern. At all times in this state we verify the reception of a switch to voice message indicating the other end is going back to voice. We also continuously verify that there is energy at the modem receiver. If a loss of energy is detected, a switch to voice is sent to the remote end and we switch to voice.

The pseudo code for this state follows:

```
Initialization Function:
void V32AnsWaitSendACInit (*ParamPtr)                                       ; FSA calling convention
    nDataCDta->ProtoFlag = V32_ANS_SEND_AC_STATE
    RDSEvent(#V32B_FSA_STATUS, V32_ANS_SEND_AC_STATE    ; Event report state change
    nDataCDta->nDataTimers[TIMER1] = 65535                                  ; sanity timer not used
    TIMER_2 = V32_TIME_64T - V32_TIME_TRANS1_DET - (2*nDataCDta->NSampPerCall)
                - nDataCDta->NSampPerIteration
    return
State Code: V32AnsWaitSendAC1State
Uses the state function V32WaitTrans2
```

The V32AnsWaitSilDet state is responsible of detecting the end of the CC sequence and to transmit the 16T of silence followed by S, SN and TRN. This is also equivalent to detecting the beginning of the silence sequence. At all times in this state we verify the reception of a switch to voice message indicating the other end is going back to voice.

The pseudo code for this state follows:

```
void V32AnsWaitSilDetInit (*ParamPtr)                                           ; FSA calling convention
    nDataCDta->ProtoFlag = V32_ANS_SILENCE_DET_STATE ;
    RDSEvent(#V32B_FSA_STATUS, V32_ANS_SILENCE_DET_STATE)      ; Event report state change
    nDataCDta->nDataTimers[TIMER1] = V32_SILENCE_DET_TIMEOUT   ; Start sanity timer
    ModemControl(nDataCDta->ModemTxPtr,                                         ; transmit AC pattern
                MC_OP_SET_V32_TX_STATE, MC_P1_SEND_AC)
    ModemControl(nDataCDta->ModemRxPtr,                                         ; Set receiver to pause
                MC_OP_SET_V32_RX_CONFIG, MC_P1_ANS_PAUSE0) ; detection of S to avoid
    return
State Code:
    nextState V32AnsWaitSilDetState (*ParamPtr)                                 ; FSA calling convention
    nextState = 0                                                               ; Default,stay in this state
    if (ModemControl(nDataCDta->ModemRxPtr, MC_OP_STATUS_REQ_V32,MC_P1_TONE_END)
        nextState = 1                                                           ;   state AnsWaitR1Msg
    endif
    if (V32Sw2VoiceMsg(nDataCDta) = 1)                                          ; check for Sw to voice msg
        nextState = 2                                                           ;   state Sw2VoiceMsgRx
    elseif = 2                                                                  ; Both mode same ?
        nextState = 3                                                           ;   state Sw2VoiceModeFail
    endif
    return (nextState)
```

The V32AnsDelayECStart state starts a timer to delay the beginning of the echo canceller training. This timer is necessary since we want to start adaptating when the TRN sequence is started. The delay before starting the adaptation is 16T of silence, plus 256T of S , plus 16T of SN, plus the buffering delay (one buffer for transmission and one buffer for reception) and finally plus the round trip delay measurement jitter (NSampPerIteration).

The optional note sequence is not transmitted and is therefore not taken into account.

The pseudo code for this state follows:

unsupported speeds and then written to the software modem. When the rate is written to the modem, this also instructs it to transmit that rate. The EC adaptation is started in the init state since we are about to start the transmitting TRN. Two timers are started in this init state, the first one is the timer used to make sure that we transmit the minimum amount of TRN (1280T) and the other one is the maximal allowed time to train the echo canceller. This involves resetting the taps to zero, zeroing the delay line of the far-end echo canceller and configuring the delay line based on the round trip delay for the far-end echo canceller.

```
Initialization Function:
void V32AnsDelayECStartInit (*ParamPtr)                                    ; FSA calling convention
    nDataCDta->ProtoFlag = V32_ANS_EC_DELAY STATE
    RDSEvent(#V32B_FSA_STATUS, V32_ANS_EC_DELAY_STATE)                     ; Event report state change
    nDataCDta->nDataTimers[TIMER1] = 65535                                 ; Start sanity timer
    ModemControl(nDataCDta->ModemTxPtr,                                    ; tx  16T silence, 256T S,
              MC_OP_SET_V32_TX_STATE, MC_P1_SEND_XYS_TRN,16, 256) ; 16T SN, TRN
                                                                           ; delay Start of EC after
                                                                           ; silence, S, SN
    TIMER_2 = V32_TIME_256T + 2*V32_TIME_16T +                             ; delay Start of EC after
              (2*nDataCDta->NSampPerCall) +                                ; 16T silence, 256T S
        1*nDataCDta->NSampPerIteration    ; and 16T of SN
                                                                           ; in/out buffering delay
                                                                           ;and jitter
    return
State Code: V32AnsDelayECStart
Uses the state function V32Wait4Time
```

The V32AnsWaitR1Msg state waits for rate sequence R1message from the other end. When the rate is received, the rate is extract from the message, modified to clear the The pseudo code for this state follows:

```
Initialization Function:
void V32AnsWaitR1MsgInit (*ParamPtr)                                       ; FSA calling convention
    nDataCDta->ProtoFlag = V32_ANS_R1_MSG_STATE
    RDSEvent(#V32B_FSA_STATUS, V32_ANS_R1_MSG_STATE)                       ; Event report state change
    nDataCDta->nDataTimers[TIMER1] = 65535                                 ; Start sanity timer
    ECAdaptON(nDataCDta->Stream)                                           ; start the EC adaptation
    RDSEvent (#V32_START_EC)                                               ; Event report message
    V32Dta->RT = ModemControl(nDataCDta->ModemRxPtr,                       ; read the round trip
              MC_OP_STATUS_REQ_V32, MC_P1_RX_ROUND_TRIP) ; delay MT
              - V32_TIME_64T - (2*nDataCDta->NSampPerCall)
    TIMER_2 = V32_TIME_MIN_TRN                                             ; minimal TRN timer
    TIMER_3 = V32_TIME_MAX_TRN + V32Dta->RT +                              ; maximal stretch of TRN
              (2*nDataCDta->NSampPerCall)                                  ;
    V32Dta->FlagMsgRx = 0                                                  ; inform state msg not rx
    EC.DelayLine = V32Dta.RoundTrip + (2*nDataCDta->NSampPerCall)
    return
State Code: V32AnsWaitR1MsgState
Use the state function V32WaitRMsg
```

The V32AnsWaitSDet waits for the modem receiver to detect S and to start transmitting silence. The EC is stopped in the init state since we are about to transmit R1 that follows the TRN sequence. At all time in this state we verify the reception of a switch to voice message indicating the other end is going back to voice. We also re-enable the S detector at this point since we are about to detect S from the other modem.

The pseudo code for this state follows:

```
void V32AnsWaitSDetInit (*ParamPtr)                                        ; FSA calling convention
    nDataCDta->ProtoFlag = V32_ANS_S_DET_STATE
    RDSEvent(#V32B_FSA_STATUS, V32_ANS_S_DET_STATE)                        ; Event report state change
    nDataCDta->nDataTimers[TIMER1] = V32_S_DET_TIMEOUT                       ; Start sanity timer
    ECAdaptOff(nDataCDta->Stream)                                          ; stop the EC adaptation
    RDSEvent(#V32_STOP_EC)                                                 ; Report the operation
    ModemControl(nDataCDta->ModemRxPtr,                                    ; CLEAR pause of S Det
        MC_OP_CLR_V32_RX_CONFIG, MC_P1_ANS_PAUSE0)
    ModemControl(nDataCDta->ModemTxPtr,                                    ; transmit R1 sequence
        MC_OP_SET_V32_TX_STATE, MC_P1_SEND_RATE, V32Dta->MaskR)      return
State Code:
nextState V32AnsWaitSDetState (*ParamPtr)                                  ; FSA calling convention
    nextState = 0                                                          Default,st5y in this state
    if (ModemControl(nDataCDta->ModemRxPtr, MC_OP_STATUS_REQ_V32, ; S detected ?
            MC_P1_S_DET)
        nextState = 1                                                      ;    state AnsWaitR2Det
    endif                                                                  ; timer not expired
    if (V32Sw2VoiceMsg(nDataCDta))                                  ; check for Sw to voice msg
        nextState = 2                                                      ;    state Sw2VoiceMsgRx
    endif
    return(nextState)
```

The V32AnsWaitR2Det is responsible of detecting the R2 sequence from the software modem and to report it to the remote modem. We apply here the necessary modifications to the rate sequence before it is transmitted to the remote end.

The pseudo code for this state follows:

```
void V32AnsWaitR2DetInit (*ParamPtr)                                       ; FSA calling convention
    nDataCDta->ProtoFlag = V32_ANS_R2_DET_STATE
    RDSEvent(#V32B_FSA_STATUS, V32_ANS_R2_DET_STATE)                       ; Event report state change
    nDataCDta->nDataTimers[TIMER1] = V32_R2_DET_TIMEOUT                      ; Start sanity timer
    ModemControl(nDataCDta->ModemTxPtr,                                    ; transmit silence pattern
        MC_OP_SET_V32_TX_STATE, MC_P1_SEND_SILENCE)
    nDataCDta->nDataTimers[TIMER2] = 0                                     ; No Energy detect waiting
    return
State Code: V32AnsWaitR2DetState
Uses the state function V32WaitRDet
```

The V32AnsWaitR3Msg state waits for the rate sequence R3 from the other end. When received the rate is compared against the GSTN clear down request for the appropriate mode to detect such demands coming from the other end. In that case a transition to the V32GSTNClearDown state is requested. We exit from this state only if the message has been received and the minimum amount of TRN is respected. The minimum amount of TRN in this case is 1280T but since we start the transmission of S, SN and TRN our timer is loaded with the value of 256T+16T+1280T. At all times in this state we verify the reception of a switch to voice message indicating the other end is going back to voice. We also continuously verify that there is energy at the modem receiver. If a loss of energy is detected, a switch to voice message is sent to the remote end and we switch to voice.

The pseudo code for this state follows:

```
Initialization Function:
void V32AnsWaitR3MsgInit (*ParamPtr)                              ; FSA calling convention
    nDataCDta->ProtoFlag = V32_ANS_R3_MSG_STATE
    RDSEvent(#V32B_FSA_STATUS, V32_ANS_R3_MSG_STATE)              ; Event report state change
    nDataCDta->nDataTimers[TIMER1] = V32_R3_MSG_TIMEOUT           ; Start sanity timer
    ModemControl(nDataCDta->ModemTxPtr,                           ; Generate long TRN
            MC_OP_SET_V32_TX_STATE, MC_P1_SEND_YS_TRN, 0, 256) ; 256 S, SN, TRN
    TIMER_2 = V32_TIME_1280T + V32_TIME_256T + V32_TIME_16T    ; Minimum duration of TRN
    V32CompPktSize(V32Dta, nDataCDta)                             ; compute packet size table
    V32Dta->FlagMsgRx = 0                                         ; Message not received yet
    return
State Code:
nextState V32AnsWaitR3MsgState (*ParamPtr)                        ; FSA calling convention
    nextState = 0                                                 ; Default,stay in this state
    if ((QDescriptor = GetQ(nDataCDta->NetRxQRead, tmpbuffer))
        if ((QDescriptor & #DPKT_BAD_FCS_MASK) = 0)               ; Test FCS bit
            switch (QDescriptor & #Q_OPCODE_MASK)
                case #V32_R3_DET_MSG:
                    V32bDtaPtr->R3 = tmpbuffer[0]                 ; Read value from message
                    if (V32Dta->R3 = V32BIS_RATE)                 ; what type of rate ?
                        tmp = (V32Dta->R3 & V32B_GSTN_CLEAR_DOWN) ; compare with GSTN
                        V32Dta.E = V32Dta->R3 | V32_E_BIT_V32B_MASK ; create E from R3
                    else
                        tmp = (V32Dta->R3 & V32_GSTN_CLEAR_DOWN)  ; compare with GSTN
                        V32Dta.E = V32Dta->R3 | V32_E_BIT_V32_MASK ; create E from R3
                    endif
                    if (tmp = 0)
                        nextState = 2                             ;    state GstnClearDown
                    else
                                                                  ; Display both values
                                                          ; which are the same
                        RDSEvent(V32_RATE_SEQ, V32Dta->R3,V32Dta->R3)
                        V32->FlagMsgRx = 1                        ; Memo we got the message
                        get speed and mode from R3
                        nDataRateConfig(nDataCDta->Stream, Speed, 1) ; Cfg NL (eff)
                        StartPacketizer(nDataCDta->Stream, V32_DATA_MSG)
                    endif
                case #V32_SW_TO_VOICE_MSG:                        ; Received switch msg
                    nextState = 3                                 ;    state Sw2Voice
                default :
                    RDSEvent(#RX_UNEXPECTED_MSG, Opcode)          ; Event report warning msg
            endswitch
        else                                                      ; Bad FCS (stay here)
            RDSEvent(#EV_V32_WARNING, #RX_BAD_FCS_MSG)            ; Event report warning msg
        endif
    endif
    if ((nextState == 0) && ((TIMER_2 == 0) && (V32Dta->FlagMsgRx)))   ; Time to go to
    nextState = 1                                                 ; next state if MSG Rx and
                                                                  ; spent enough time here
                                                                  ;    state AnsWaitEDet
    endif
    if (!V32IsEnergy(nDataCDta))                                  ; check for Energy
        nextState = 3                                             ;    state Sw2Voice
    endif
    return(nextState)
```

The V32AnsWaitEDet state function is responsible of waiting for the demodulation of the E rate sequence. We need to wait for the detection of the E sequence because the software modem usesthis information for its final data rate and modulation type configuration. The rate received (E) is compare against the computed E from the R3 rate sequence. This is required to make sure that the modem receiver and modem transmitter are configured exactly the same. If they are different, a switch to voice is requested. At the same time it also continuously monitors the network layer for the incoming of a switch to voice message and verifies that the demodulator is receiving energy.

The pseudo code for this state function follows:

```
void V32AnsWaitEDetInit (*ParamPtr)                               ; FSA calling convention
    nDataCDta->ProtoFlag = V32_E_DET_STATE
    RDSEvent(#V32B_FSA_STATUS, V32_E_DET_STATE)                   ; Event report state change
    nDataCDta->nDataTimers[TIMER1] = V32_E_DET_TIMEOUT            ; Start sanity timer
    ModemControl(nDataCDta->ModemTxPtr,                           ; transmit R3 sequence
```

-continued

```
        MC_OP_SET_V32_TX_STATE, MC_P1_SEND_RATE, &(V32bDta->R3)
    return
State Code:
nextState V32AnsWaitEDet (*ParamPtr)                    ; FSA calling convention
    nextState = 0                                       ; Default,stay in this state
    if (ModemControl(nDataCDta->ModemRxPtr,             ; E Detected?
                MC_OP_STATUS_REQ_V32, MC_P1_E_SEQ_DET))
        RxE = ModemControl(nDataCDta->ModemRxPtr,                ; Get the detected E
                MC_OP_STATUS_REQ_V32, MC_P1_RX_E_WORD
        if (V32Dta->E != RxE)                           ; Make sure is as expected
            RDSEvent(V32_RATE_DIFF, V32bDtaPtr->R3,RxE) ; Report the rate difference
            nextState = 2                               ;    state Sw2Voice
        else                                            ; Read the final speed
            nextState = 1                               ;    State WaitData
        endif
    endif
    if (V32Sw2VoiceMsg(nDataCDta))                      ; check for Sw to voice msg
        nextState = 2                                   ;    state Sw2Voice
    else if (!V32IsEnergy(nDataCDta))                   ; Check for Energy loss
        nextState = 2                                   ;    state Sw2Voice
    endif
```

The V32AnsWaitData state waits to be ready to start the full duplex exchange. The init state reads the final speed and mode from the modem receiver and configures the network layer and the packetizer accordingly. The init state also requests the transmission of the E sequence followed by a lot of B1. The state itself is the V32WaitData and waits for the queue level to be optimal. The state doesn't have to wait for the detection of E since it has already being detected. in the previous state.

The pseudo code for this state follows:

from the transmitter handler is zero, this indicates that everything was processed normally. When the transmitter handler returns a value different of zero this indicates that either it has to stop because of a switch to voice or it has received the end.of data message and there is no more data to process. The same goes for the receiver, when it returns a zero, this indicates that the receiving process went as expected but when it returns a value different than zero this means that it has to stop processing. It could occur that the receiver or the transmitter require their process to be stopped

```
Initialization Function:
void V32AnsWaitDataInit (*ParamPtr)                     ; FSA calling convention
    nDataCDta->ProtoFlag = V32_WAIT_DATA_STATE
    RDSEvent(#V32B_FSA_STATUS, V32_WAIT_DATA_STATE)     ; Event report state change
    nDataCDta->nDataTimers[TIMER1] = V32_WAIT_DATA_TIMEOUT  ; Start sanity timer
    ModemControl(nDataCDta->ModemTxPtr,                 ; Send E and Xtra long B1
            MC_OP_SET_V32_TX_STATE, MC_P1
_SEND_EYB1, V32Dta->E, 32767)
    V32Dta->DataMsgTx = 0                               ; Start MSG not sent yet
State Code: V32AnsWaitDataState
Uses the state function V32WaitData
```

The V32DataMode state is responsible of querying the software modem for the number of bytes that must be transmitted and to process the demodulated bytes received. This is doneby calling two functions, the software modem transmitter handler and the software modem receiver handler. The return value of each handler is verified since it contains the results of their operations. If the return value at the same time (same iteration), this is treated as a request to switch to voice. The init state of data mode is responsible for enabling the rate controller and to configure the depacketizer. It also sets the maximal value for the sanity timer since it is not used in this state.

The pseudo code for this state follows:

```
void V32DataModeInit (*ParamPtr)                        ; FSA calling convention
    nDataCommonDta->ProtocolFlag = V32_DATA_STATE       ;
    RDSEvent(#V32B_FSA_STATUS, V32_DATA_STATE)          ; Event report state change
    TIMER1 = 65535                                      ; timer 1 not used (max)
                                                        ; enable the rate controller
    nDataEnableRateCtl(nDataCDta->Stream, V32Dta->OptQLevel)
                                                        ; init & start the
    StartDepacketize(nDataCDta->Stream, nDataCDta->DepktPtr)        ; depacketizer
```

-continued

```
        return
State Code:
nextState V32DataModeState (*ParamPtr)                          ; FSA calling convention
    nextState = 0                                               ; Default,stay.in this state
    TIMER_1 = 65535                                             ; timer1 to max not used
    retValTx = V32SmodemTXHandler(nDataCDta, V32Dta)                ; Process Modulation
                                                                ; Process demodulation
    retValRx = V32SmodemRXHandler(nDataCDta, V32Dta, V32_CHECK_CARRIER)
    if ((retValTx = V32_STOP_MODULATOR) && (retValRx = V32_STOP_DEMODULATOR))
        nextState = 4                                           ;    state Sw2VoiceInvalideOpe
    else                                                        ; one of them is ok
        switch(retValRx)                                        ; check demodulator
            case V32_DEMODULATOR_OK :                           ; demo is ok
                switch (retValTx)
                    case V32_STOP_MODULATOR :                   ; but mode want to stop
                        nextState = 1                           ;    state DataRxOnly
                    case V32_MODULATOR_RX_SW :                  ; rx sw2voice msg
                        nextState = 3                           ;    state Sw2VoiceMsgRx
                endswitch
            case V32_STOP_DEMODULATOR :                         ; demodulator want to stop
                if (retValTx = V32_MODULATOR_RX_SW)             ;
                    nextState = 3                               ;    state Sw2VoiceMsgRx
                else
                    nextState = 2                               ;    state DataTxOnly
                endif
        endswitch
    endif
```

The V32DataRxOnly state is responsible of processing the modulated bytes from the external modem until the modem drops its carrier or ceases transmitting. Once either loss of carrier or no demodulated bytes are detected, the state requests a transition to switch to voice.

The pseudo code for this state follows:

The V32DataTxOnly state is responsible of processing the remaining queue elements until a message is received indicating to stop transmitting or when no more queue elements are available. Then the state will stop modulation and request a transition to the switch to voice state.

```
void V32DataRxOnlyInit (*ParamPtr)                              ; FSA calling convention
    TIMER1 = 65535                                              ; timer 1 not used (max)
    nDataCDta->ProtoFlag = V32_DATA_RX_STATE                    ;
    RDSEvent(#V32B_FSA_STATUS, V32_DATA_RX_STATE)               ; Event report state change
    ModemControl(nDataCDta->ModemTxPtr,                         ; Stop modulation
                 MC_OP_STOP_MODULATION)
    return
State Code:
nextState V32DataRxOnlyState (*ParamPtr)                        ; FSA calling convention
    nextState = 0                                               ; Default,stay in this state
    TIMER1 = 65535                                              ; timer 1 not used (max)
                                                                : process the demodulator
    if (SmodemRxHandler(nDataCDta, V32Dta, V32_CHECK_CARRIER) != 0)
        nextState = 1                                           ;    state Sw2Voice
    endif
```

The pseudo code for this state follows:

```
void V32DataTxOnlyInit (*ParamPtr)                              ; FSA calling convention
    TIMER1 = 65535                                              ; timer 1 not used (max)
    nDataCDta->ProtoFlag = V32_DATA_TX_STATE                    ;
    RDSEvent(#V32B_FSA_STATUS, V32_DATA_TX_STATE)               ; Event report state change
    return
State Code:
nextState V32DataTxOnlyState (*ParamPtr)                        ; FSA calling convention
    nextState = 0                                               ; Default,stay in this state
    TIMER1 = 65535                                              ; timer 1 not used (max)
```

```
    if (V32SmodemTxHandler(nDataCDta, V32Dta) != 0)    ; Process Modulation
        nextState = 1                                  ;   state Sw2Voice
    endif
```

The V32Sw2VoiceState state doesn't perform anything, it just waits for the nData scanner to read the request and to perform the switch to voice. All the processing is done in the initialization routine. The initialization routine is responsible for generating the V32_SW_TO_VOICE_MSG message, setting the protocol flag to request the switch, generating the RDS events and finally to stop the modulation. Several initialization routines exist and are selected depending on the reason for switching. The V32Sw2VoiceMsgRxInit is the only routine not sending the V32_SW_TO_VOICE_MSG to the remote end since we just have received this indication from the other end.

The V32Sw2VoiceInit is selected when the modem has unsuccessfully configured itself in the init function of the modem relay. This sends the V32_SW_TO_VOICE_MSG to the remote end, sets the protocol flag to request the switch to voice and generates the RDS event.

The pseudo code for this init state follows:

```
void V32Sw2VoiceInit (*ParamPtr)              ; FSA calling convention
    V32Sw2VoiceFct(nDataCDta, V32_PROTOCOL_INIT_FAIL)
    return
```

The V32GSTNClearDown state sends the remaining rate sequence (R3) for a period of at least 64T as required by the protocol then stops the modulation, set the protocol flag to indicate a switch to voice is requested and transitions to the switch to voice state.

The pseudo code for this state follows:

```
void V32GSTNClearDownInit (*ParamPtr)                              ; FSA calling convention
                                                                   ; Event report state change
    RDSEvent(#V32B_FSA_STATUS, V32_GSTN_CLEAR_DOWN, nDataCDta->ProtoFlag )
    TIMER_1 = 65535                                                ; timer 1 not used (max)
    TIMER_2 = TIME_64T                                             ; timer 2 >= 64T
    return
State Code:
nextState GSTNClearDownState (*ParamPtr)                           ; FSA calling convention
    nextState = 0
    if (TIMER_2 = 0)                                               ; transmit at least 64T of R
        ModemControl(nDataCDta->ModemTxPtr, MC_OP_STOP_MODULATION)
                                                                   ; set next state to indicate
        nextState = 1                                              ; wants to switch to voice
    endif
    return(0)
```

The V.32 caller and answerer states communicate to the remote end by network link messages to inform or request appropriate action (navigate the V.32 protocol and transfer demodulated data). Messages are classified as either control or non-control. Control messages signal the appropriate actions required to navigate the state of the V.32 protocol. Non-control messages contain demodulated V.32 data. The V32_MODEM_INFO_MSG and V32_R_DET_MSG are control messages sent with information attached to it. Since they have information (data) attached to it they are considered by the network layer as data messages. To avoid the call being stopped when the message received is in error (bad FCS), the message is sent twice. The second will be discard by the remote end if the first message is valid.

TABLE 4

V.32 bis Modem Relay Network Layer Messages

| Token | Op-co (Decim | Name | Parameter |
|---|---|---|---|
| V32_MODEM_INFO_MSG | 1 | report Mode, packet siz ID | Mode, PktSize, ID (V32CapDta) |
| V32_R_DET_MSG | 2 | Detection of rate Sequence (R1, R2, R3) | Rate sequence |
| V32_DATA_START_MSG | 3 | Data start message | none |
| V32_DATA_MSG | 4 | Data | Data |
| V32_DATA_END_MSG | 5 | Data end message | none |
| V32_SW_TO_VOICE_MSG | 6 | Switch back to voice mo | none |

Figure 6:
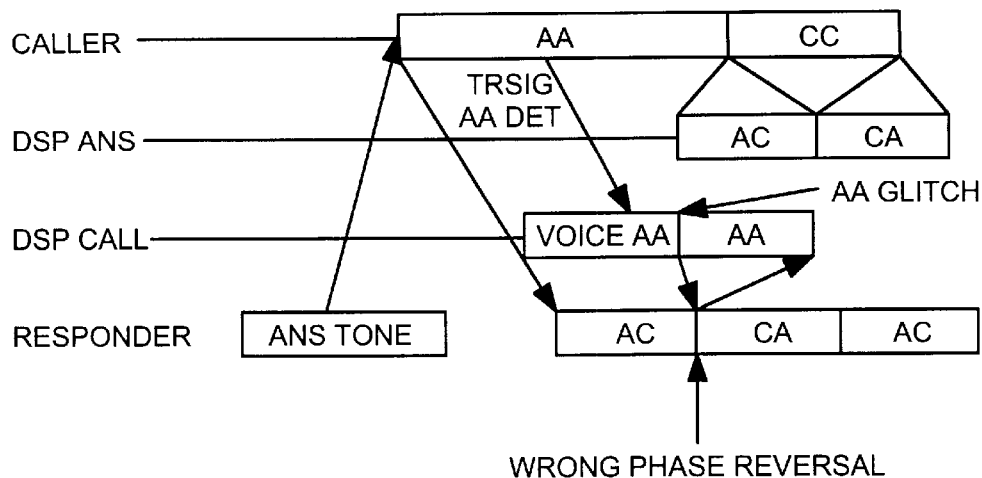
FIG. 6 illustrates false phase reversal detection in an answering modem.
Figure 7:
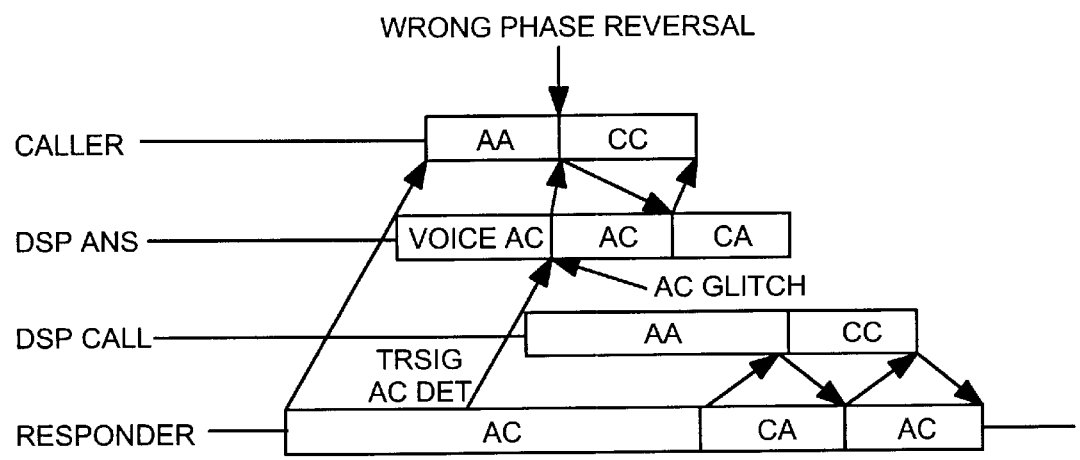
FIG. 7 illustrates false phase reversal detection in a caller modem.
Figure 8A:
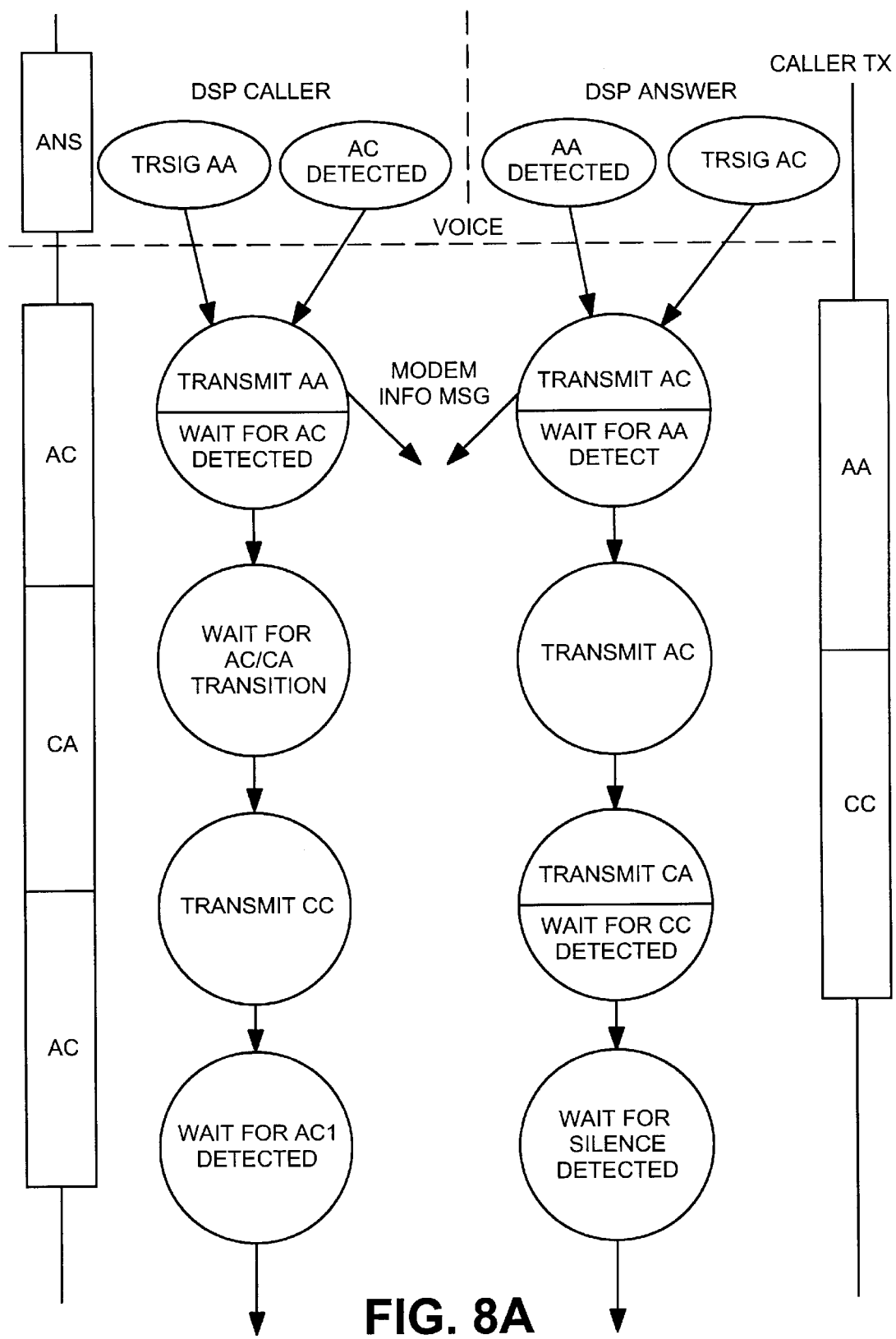
FIGS. 8a to 8d illustrate the modem relay state sequence.
Figure 8B:
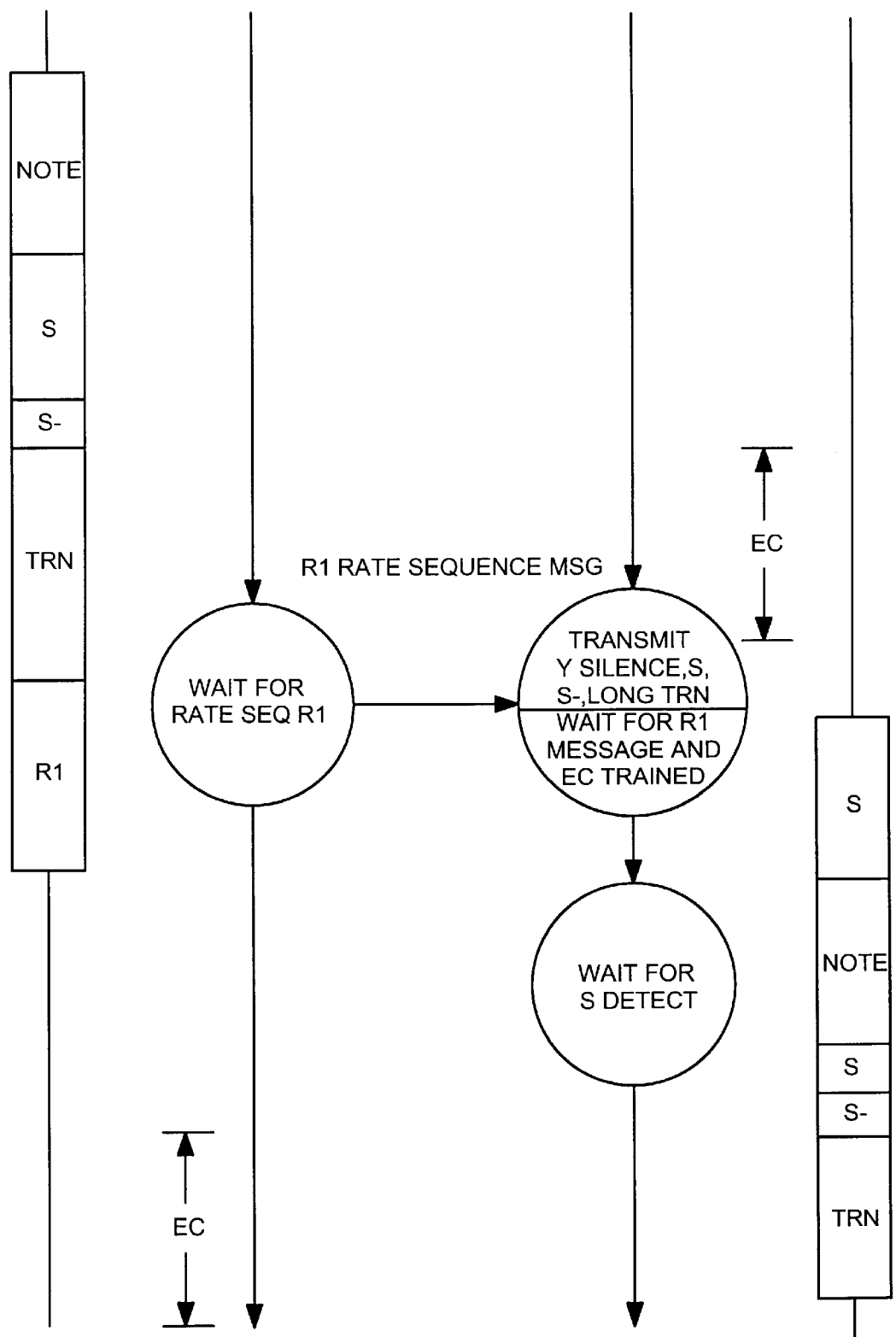
Figure 8C:
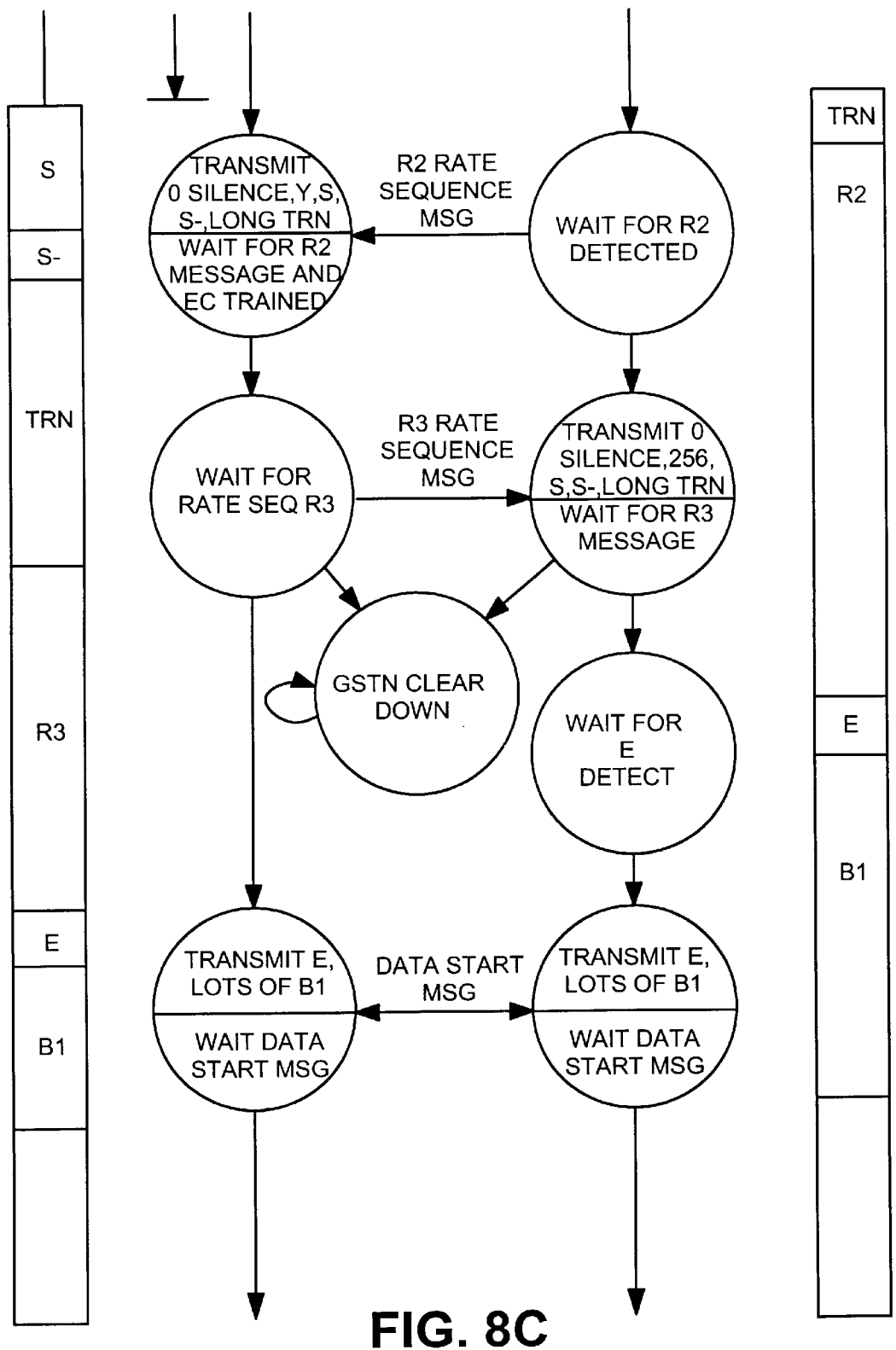
Figure 8D:
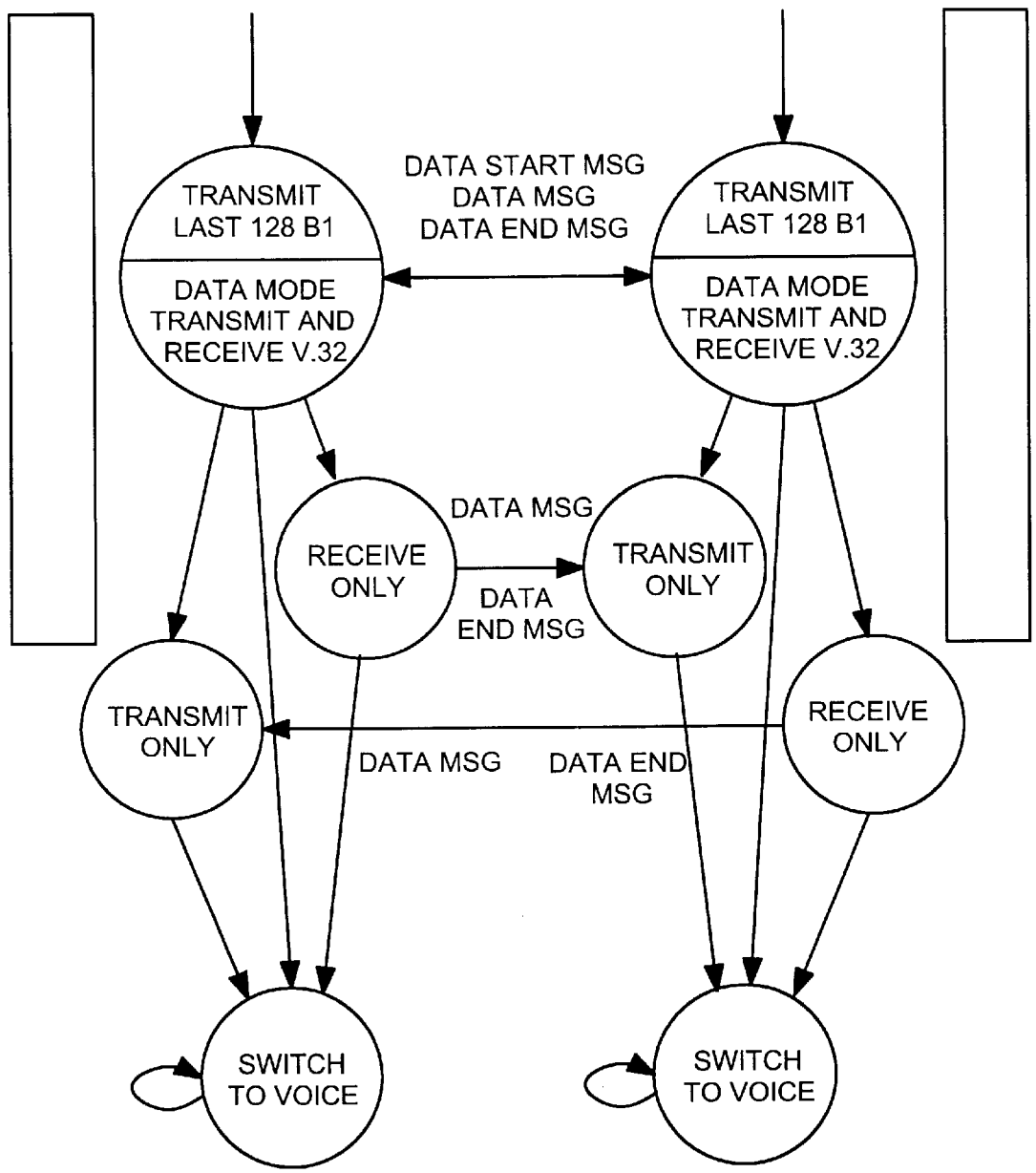
Figure 9:
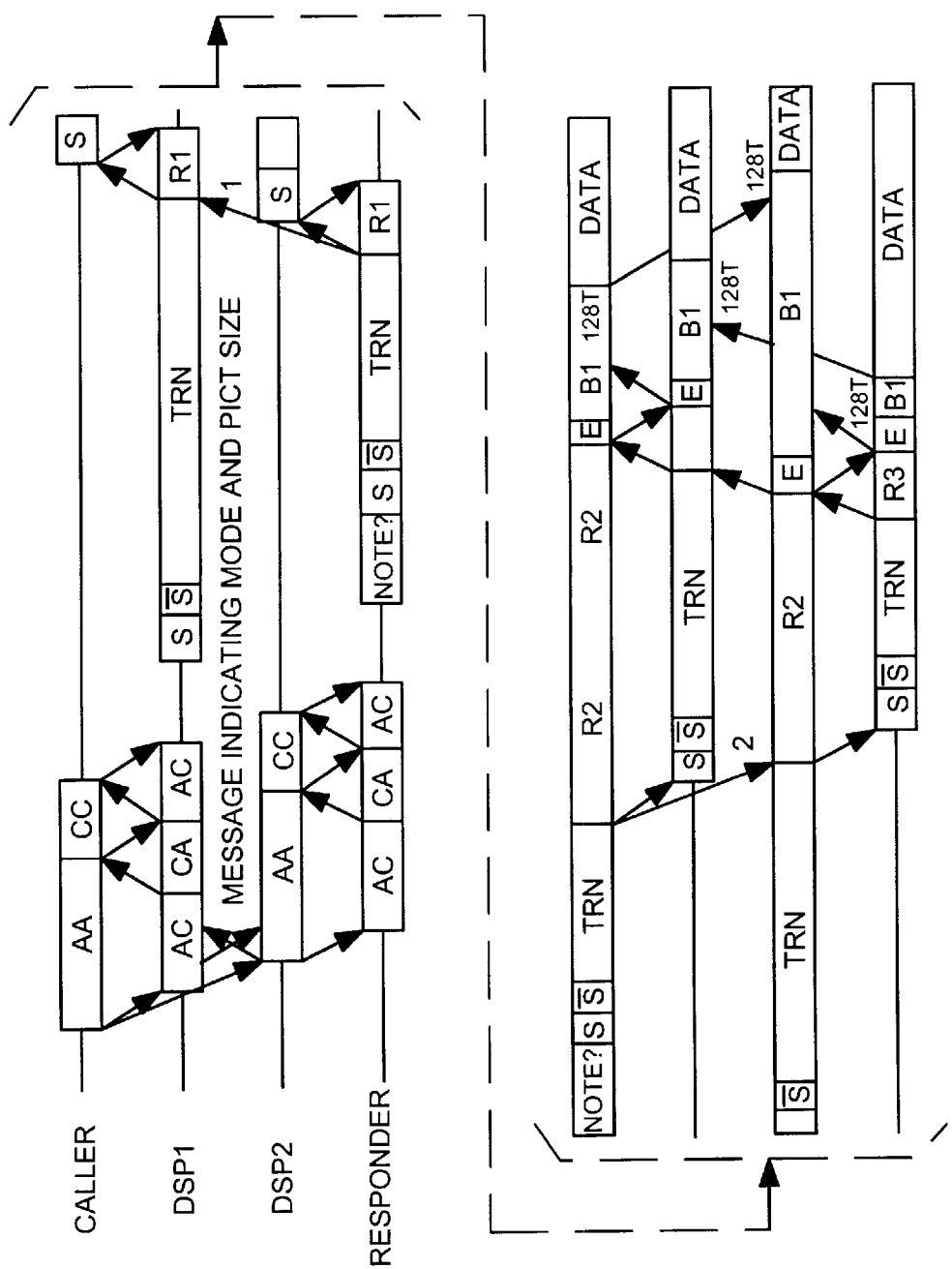
FIG. 9 illustrates the modem relay handshake sequence.

Due to the amount of time required by the voice detector to detect the AA (1800 hz) or the AC (600 and 3000 Hz) tones it is necessary to use a notch filter at these values to eliminate the possibility of the far end modem seeing a phase reversal when the real AA or AC transmission starts in data mode. The glitch may be seen by the other modem as the phase reversal indicating the start of its transition from AC to CA or AA to CC which will eventually cause a modem failure. FIGS. 6 and 7 illustrate answer and call modem false phase detection respectively.

The echo canceller (EC) provided with the software modem won't be use for two reasons. First the voice kernel (VK) is already providing one and there isn't enough real time (CPU) and RAM to run the software modem one.

Two echo cancellers are needed. One for the near end cancellation and another one for the far end cancellation. The near end EC doesn't require anything special from our point. We just have to start and stop it at the right time during the sequence. These start and stop location are explained in the two following sections since they are different depending on the mode of operation of the modem (caller or answerer). The far end EC is more complex since it has to take into account the estimated round trip delay of the modem, the buffering and detection time of the modem and our system (nData). When EC is started, this involves resetting the taps to zero, zeroing the delay line of the far-end echo canceller and configuring the delay based on the round trip delay estimate (NT or MT) for the the far-end echo canceller. Because we must make sure the training of the echo canceller is successful, the system must stay in the state for a minimum time, the minimum training time for the EC. The ITU G.165 specs indicates that echo cancellers must train within 650 ms. As a safety factor, we require that the system stay in this state at least 1 s plus the round trip delay to allow the far-end EC the same valid training time.

In Answer mode, the EC should start to adapt when the first S sequence is transmitted and should stop the adaptation at the end of that sequence.

In Call mode, the EC adaptation is started when the transmission of first S sequence is started, again here the EC is stopped when the TRN sequence is over.

The V.32 and V.32 bis protocols allow some variance on the length of certain preamble sequences, we utilize robustness timers at every step of the preamble to ensure that if an error occurs in recognizing a preamble sequence or receiving a message, we fall back to voice mode and do not hang the DSP in that state. Next how each timeout for each state is computed is described.

V.32 specification list of sequence and their timing The optional echo cancellation sequence (NOTE) must not exceed 8192 symbol intervals @ 2400 symbols/s; approximately 3400 ms. The TRN sequence must not exceed 8192 symbol intervals @ 2400 symbols/s; approximately 3400 ms.

In all transitions which involve messaging with the remote end, a 1300 msec network delay is allowed for. This value permits two satellite delay hops.

Network delay=(one satellite delay×2 way)×number of satellites+terrestrial delay (propagation) 1300 msec=(270 msec×2)×2+220 msec This first implementation of the modem relay does not support the presence of the note sequence or the case when an external modem transmits the maximal amount of TRN (8192T). The reason comes from the fact .that we are stretching the DSP's TRN sequence until the reception of the TRN termination from the external modem therefore if the external modem sends the maximal amount of TRN, we will transmit more than the maximal amount allocated in the specification. The behaviour of the modems in this condition is not known.

The state code function V32Wait4Tone simply waits for the detection of a tone. It stays in the same state as long as the tone is not detected. At the same time it also continuously monitors the network layer for the incoming of a switch to voice message.

The pseudo code for this state function follows:

```
nextState V32Wait4Tone (*ParamPtr)                    ; FSA calling convention
    nextState = 0                                     ; Default,stay in this state
    if (ModemControl(nDataCDta->ModemRxPtr,           ; look for AC pattern
        MC_OP_STATUS_REQ_V32, MC_P1_TONE_DET)
        nextState = 1                                 ; state done
    endif
    if (V32Sw2VoiceMsg(nDataCDta))                    ; check for msg (SW, mode)
        nextState = 2                                 ;    state Sw2Voice
    endif
    return (nextState)
```

The state code function V32Wait4Time simply waits for the expiry of timer #2. It stays in the same state as long as the timer is not expired. At the same time it also continuously monitors the network layer for the incoming of a switch to voice message and verifies that the demodulator is receiving energy.

The pseudo code for this state function follows:

```
nextState V32Wait4Time (*ParamPtr)              ; FSA calling convention
    nextstate = 0                               ; Default,stay in this state
    if (TIMER_2 = 0)                            ; Wait the expiry of timer 2
        nextstate = 1                           ;    state done
    endif                                       ; Timer not expired
    if (V32Sw2VoiceMsg(nDataCDta))              ; check for msg (SW, mode)
        nextState = 2                           ;    state Sw2Voice
    else if (!V32IsEnergy(nDataCDta))           ; check for Energy loss
```

-continued

```
        nextState = 2                           ;    state Sw2voice
    endif
    return (nextState)
```

The state code function V32WaitTrans1 simply waits for the arrival of the first phase reversal. It stays in the same state as long as the phase reversal is not detected. The 64T delay is evaluated and if required the appropriate state will be entered otherwise we transition to the state transmitting the phase reversal. At the same time it also continuously monitors the network layer for the incoming of a switch to voice message and verifies that the demodulator is receiving energy.

The pseudo code for this state function follows:

```
nextState V32WaitTrans1 (*ParamPtr)                                                    ; FSA calling convention
    nextState = 0                                                                      ; Default,stay in this state
    if (ModemControl(nDataCDta->ModemRxPtr, MC_OP_STATUS_REQ_V32, MC_P1_TRAN1_DET))
        if ((V32_TIME_64T - V32_TIME_TRANS1_DET - (2*nDataCDta->NSampPerCall)
            - nDataCDta->NSampPerIteration > 0)
            nextState = 1                                                              ;    WaitSend State
        else
            nextstate = 2                                                              ; bypass WaitSend State
        endif
    endif
    if (V32Sw2VoiceMsg(nDataCDta)                                                      ; check for nsg (SW, mode)
        nextState = 3                                                                  ;    state Sw2Voice
    else if (!V32IsEnergy(nDataCDta))                                                  ; check for Energy loss
        nextState = 3                                                                  ;    state Sw2Voice
    endif
    return (nextState)
```

The state code function V32WaitTrans2 simply waits for the arrival of the second phase reversal. It stays in the same state as long as the phase reversal is not detected. At the same time it also continuously monitors the network layer for the incoming of a switch to voice message and verifies that the demodulator is receiving energy.

The pseudo code for this state function follows:

```
nextState V32WaitTrans2 (*ParamPtr)                                                    ; FSA calling convention
    nextState = 0                                                                      ; Default,stay in this state
    if (ModemControl(nDataCDta->ModemRxPtr, MC_OP_STATUS_REQ_V32, MC_P1_TRAN2_DET)
```

-continued

```
        nextstate = 1                                    ; state done
    endif
    if (V32Sw2VoiceMsg(nDataCDta))                       ; check for msg (SW, mode)
        nextState = 2                                    ;    state Sw2Voice
    else if (!V32IsEnergy(nDataCDta))                    ; check for Energy loss
        nextState = 2                                    ;    state Sw2Voice
    endif
    return (nextState)
```

The V32WaitRDet statefunction is responsible of detecting a rate sequence from the external modem. It also verifies the capabilities of the local end before transmitting the message with the modified rate sequence to the remote end. The maximal rate of the modem capability is verified since it is possible the modem max rate offered by the external modem exceeds the available bandwidth. At all time in this state we verify the reception of a switch to voice message indicating the other end is going back to voice. We also continuously verify that there is energy at the modem receiver. If a loss of energy is detected, a switch to voice is sent to the remote end and we switch to voice. This verification of loss of energy can be delayed by setting TIMER_2 to the required delay.

The pseudo code for this state function follows:

The V32WaitRMsg state function is responsible for waiting for the reception of a rate sequence from the network layer. It also verifies the capabilities of the local end before sending the modified rate sequence to the modem transmitter. The maximal rate of the modem capability is verified since it is possible the modem max rate offered by the external modem exceeds the available bandwidth. If the message contains a bad frames check sequence, a switch to voice is requested since the rate received cannot be used. We exit from this state when the message is received and the minimum amount of training time has elapsed or when the message is received and the maximal amount of training time has elapsed. At all times in this state we verify the reception of a switch to voice message indicating the other end is going back to voice.

```
nextState V32WaitRDet (*ParamPtr)                                            ; FSA calling convention
    nextState = 0                                                            ; Default,stay in this state
    if (ModemControl(nDataCDta->ModemRxPtr, MC_OP_STATUS_REQ_V32, MC_P1_R1R2_DET)
        R = ModemControl (nDataCDta->ModemRxPtr,
            MC_OP_STATUS_REQ_V32, MC_P1_RX_RATE_WORD)                        ; read rate sequence R1/R2
        if (R = V32BIS_RATE)
            V32Dta->MaskR = R & V32Dta->V32brate_mask                        ; mask R with v32b mask
        else
            V32Dta->MaskR = R & V32Dta->V32rate_mask                         ; mask R with v32 mask
        endif
        RDSEvent(V32_RATE_SEQ, R, MaskR)                                     ; Display both values
        PutQ(nDataCDta->NetTxQWrite,#V32_R_DET_MSG,16, &MaskR);               Send R to other end
        PutQ(nDataCDta->NetTxQWrite,#V32_R_DET_MSG,16, &MaskR);               Send msg twice
        nextState = 1                                                        ; state done
    endif
    if (V32Sw2VoiceMsg(nDataCDta))                                           ; check for nsg (SW, mode)
        nextState = 2                                                        ;    state Sw2Voice
    else if (TIMER_2 = 0)                                                    ; Don't check too soon
        if (!V32IsEnergy(nDataCDta))                                         ; Check for Energy loss
            nextState = 2                                                    ;    state Sw2Voice
        endif
    endif
    return (nextState)
```

The pseudo code for this state function follows:

```
nextState V32WaitRMsg (*ParamPtr)                                            ; FSA calling convention
    nextState = 0                                                            ; Default,stay in this state
                                                                             ; Check if R Received
    if ((QDescriptor = GetQ(nDataCDta->NetRxQRead, tmpBufPtr))
        if ((QDescriptor & #Q_BAD_FCS_BIT_MASK) = 0) ; Test for the FCS bit
            switch (QDescriptor & #Q_OPCODE_MASK)                            ; If good, check message
                case #V32_R_DET_MSG:
                    R = tmpBufPtr[0]                                         ; Read value from message
                    if (R = V32BIS_RATE)
                        V32Dta->MaskR = R & V32Dta->V32brate_mask ; mask R with v32b mask
```

-continued

```
            else
                    V32Dta->MaskR = R & V32Dta->V32rate_mask ; mask R with v32 mask
            endif
                    RDSEvent(V32_RATE_SEQ, R, MaskR)                ; Display both values
                    V32Dta->FlagMsgRx = 1                           ; R received
            case #V32_MODEM_INFO_MSG:                               ; Read mode from message
                if (!V32InfoExtract(V32Dta, tmpBufPtr))
                    nextState = 2                                   ;    state Sw2Voice
                endif
            case #V32_SM_TO_VOICE_MSG:                              ; Received switch msg
                nextState = 2                                       ;    state Sw2Voice
            default :
                RDSEvent(#RX_UNEXPECTED_MSG, Opcode)                ; Event report warning msg
            endswitch
        else                                                        ; Bad FCS for R (may be)
            RDSEvent(#V32_BAD_FCS_MSG)                              ; Event report warning nsg
        endif
    endif
    if (V32Dta->FlagMsgRx = 1)                                      ; message RX
        EC_flag = ECTrainDone( )                                    ; check if both EC done
        if (((EC_flag) && (TIMER_2 = 0)) || (TIMER_3 = 0)) ; EC and min timer done
                                                                    ; EC not done but max tine
            nextState = 1                                           ;    state done
        endif
    endif
endif
return (nextState)
```

The V32WaitData state function is responsible of waiting for the start of the continuous data transfer. This state is common to the caller and the answerer. Its duty is to make sure the system is stable before authorizing the full blown data exchange. This means that the network queue has the optimal number of elements in it for the proper behavior of the rate controller and the E sequence from the modem has been detected. On the protocol side, we generate a very long duration of the B1 sequence. This will be guaranteed to cover at least 128T B1 because when switching from this state, we will terminate the very long sequence by requesting the generation of a 128T sequence length. The fact that we generate a very long B1 sequence simply translates into the external modem considering that the data is all 1's. Because we will generate 128T of the B1 sequence when exiting from this state, we have to take this into account when selecting the optimal size of the data queue. On the demodulation front, at all times, all the demodulated data is transferred toward the network.

Upon entry, this state sets the modem rate, and asks to generate an infinite duration of B1.

At all times we verify the presence of the carrier and if a switch to voice message is received on the network layer.

The pseudo code for this state follows:

```
State Code:
nextState V32WaitData (*ParamPtr)                                   ; FSA calling convention
    nextState = 0                                                   ; Default,stay in this state
    TIMER_2 = 65535                                                 ; set between bytes timer to
                                                                    ; max since dont know when
                                                                                ; start receiving
        RxRetVal = SmodemRxHandler(nDataCDta, V32Dta, V32_CHECK_ENERGY) ; check for energy
        switch (RxRetVal)
            case V32_PKT_ERROR :                                    ; Packetizer failed
                nextState = 2                                       ;    state Sw2VoicePktFail
            case V32_STOP_DEMODULATOR:                              ; lost energy
                nextState = 4                                       ;    state Sw2VoiceLostEnergy
        endswitch
        RxConfig = ModemControl(nDataCDta->ModemRxPtr,              ; Done when E detected
                    MC_OP_STATUS_REQ_V32, MC_P1_ESEQ_DET)
        QueueOK = 0                                                 ; Check if the NL queue has
        if (Number of elem  in Q = v32Dta->OtpQsizeM128T)           ;    correct # of elements
            QueueOK = 1
        elseif (Number of elem  in Q > v32Dta->OtpQsizeM128T)          ; Too many in it
            remove num elements - v32Dta->OtpQsizeM128T             ; remove the extra elements
            QueueOK = 1                                             ; The queue is also OK here
        endif
        if ((nextState = 0) && (QueueOK && RxConfig))                  ; No previous problems
            nextState = 1                                           ; Q opt. go to full data now endif
```

```
                                                    -continued
   if (V32Sw2VoiceMsg(nDataCDta))                   ; check for Sw to voice msg
         nextState = 3                              ;    state Sw2Voice
   endif
   return(nextState)
```

The V32Sw2VoiceMsg state function is responsible of verifying the network link queue for the switch to voice message or the modem information message. When the switch to voice message is received, the calling function is informed and a transition to the switch to voice requested. When the V32_MODEM_INFO_MSG is received, the remote end mode is read and compared with our mode (caller or answer). If the modes are identical, this means the call will eventually fail and we should request to stop now. This could happen when both side tone detectors have detected the same tone. To prevent the propagation of AA and AC tones to the other side we use three notch filters to block these tones. The packet size received in the message is also compared with ours and the lowest value kept in the database. Finally the other end system version is written to the database.

The pseudo code for the function follows:

The V32SmodemRxHandler function interrogates the software modem receiver for the number of bytes that have been demodulated. These bytes are packetized and transmitted by the network layer to the remote end. When bytes are demodulated and, if the flag indicating the generation of the V32_DATA_START_MSG isn't set, we have to send this message since we must indicates to the remote end the beginning of demodulation at this end. The function verifies the presence of carrier or energy depending on the calling function request. When either the carrier or energy disappears, the function returns this indication to the calling function.

```
retVal V32Sw2VoiceMsg (*ParamPtr)                          ; FSA calling convention
   retVal = 0                                              ; default no msg Rx
   if ((QDescriptor = GetQ(nDataCDta->NetRxQRd, tmpBufPtr))
         switch (QDescriptor & #Q_OPCODE_MASK)             ; If good, check message
         case #V32_SW_TO_VOICE_MSG:                        ; Received switch msg
              retVal = 1                                   ;    state SwitchTOvoice
         case #V32_MODEM_INFO_MSG:                         ; Read mode from message
              if (!V32InfoExtract(V32Dta, tmpBufPtr))
                  retVal = 2                               ;    state Sw2VoiceModeFail
              endif
         default :
              RDSEvent (#RX_UNEXPECTED_MSG, Opcode)        ; Event report warning msg
         endswitch
   endif
   return(retVal)
```

The pseudo code for this function follows:

```
retVal V32SmodemRxHandler(nDataDta, V32bDta, RxTest)                    ; SMODEM RX HANDLING
   retVal = V32_DEMODULATOR_OK                                          ; default no error and all
                                                                        ; bytes done.
   tmp = ModemRxBuffInfo (nDataCDta->ModemRxPtr)
   BytesRx = tmp & 0XFFFF                                               ; get how many bytes RX
   BytesRxAddr = (tmp >> 16)                                            ; get Rx Bytes address
   if (ByetsRx != 0)                                                    ; byte(s) received ?
        if (V32bDtaPtr->DataMsgTx != 1)                                 ; Is this the first packet?
             PutQ(nDataCDta->NetTxQWr,                                  ; Send DataStart Msg
                  (#V32_DATA_START_MSG | #Q_REP_COUNT_3),0,0)
             V32Dta->DataMsgTx =1                                       ; set flag
        endif
        tmp = packetize(nDataCDta->pktDta, BytesRxAddr, BytesRx, FALSE) ;
        if (tmp != TRUE)
             RDSEvent(#EV_V32_ERROR, #V32_PKT_FAIL)                     ; report it
             nDataCDta->ProtoFlag = V32_DATA_STATE_PKT_ERROR
             retVal = V32_PKT_ERROR                                     ;
        endif
        TIMER_2 = V32_MAX_TIME_BETWEEN_BYTES                            ; restart timer
```

-continued

```
endif
if ((RxTest == V32_CHECK_CARRIER) &&                    ; Check Carrier ?
    (ModemControl(nDataCDta->ModemRxPtr,MC_OP_STATUS_REQ, MC_P1_RX_CARRY)))
        RDSEvent(#EV_V32_STATUS, #V32_LOST_CARRIER)     ; Modem lost carrier
    PutQ (nDataCDta- >NetTxQwrite,                      ; Send end msg Msg
        (#V32_DATA_END_MSG | #Q_REP_COUNT_3),0,0)
    retVal = V32_STOP_DEMODULATOR                       ; inform calling fct
endif
if ((RxTest == V32_CHECK_ENERGY) &&                     ; Check energy ?
    (ModemControl(nDataCDta->ModemRxPtr,MC_OP_STATUS_REQ, MC_P1_RX_MSE)0))
        RDSEvent(#EV_V32_STATUS, #V32_LOST_ENERGY)      ; Modem lost energy
    PutQ(nDataCDta->NetTxQWrite,                        ; Send end msg Msg
        (#V32_DATA_END_MSG | #Q_REP_COUNT_3),0,0)
    retVal = V32_STOP_DEMODULATOR                       ; inform calling fct
endif
if (TIMER_2 = 0)                                        ; if haven't Rx bytes for
    RDSEvent(#EV_V32_ERROR, #V32_MODEM_UNDERFLOW)       ; long period exit.
    PutQ (nDataCDta->NetTxQWrite,                       , Send end msg Msg
        (#V32_DATA_END_MSG | #Q_REP_COUNT_3),0,0)
    retVal = V32_STOP_DEMODULATOR                       ; Warning, Modem underflow
endif
return(retVal)
```

The V32SmodemTxHandler function is responsible of querying the software modem for the number of bytes that must be transmitted. The number of bytes required by the transmitter are depacketized and copied to the software modem transmit buffer for modulation. If the depacketizer error indicates a switch to voice message or a termination packet, the error is reported to the calling function. When the depacketizer error indicates a queue failure or a bad FCS we generate the RDS event and exit the function. The queue failure indicates that we don't have any bytes for modulation. In this case the software modem will modulate zeroes automatically. If a bad FCS occurs, this mean that the data in the packet has errors, the corrupted data is modulated as is and we don't consider this as an exit condition.

The pseudo code for this function follows:

```
retval V32SmodemTxHandler(nDataCDta, V32bDta)                       ; SMODEM TX HANDLING
    retVal = V32_MODULATOR OK                                       ; default no error
    BytesReqTx = ModemTxNbytes(nDataCDta->ModemTxPtr)               ; get the nbytes required
                                                                    ; by the transmitter
    BytesPending = BytesReqTx
    while (BytesPending)                                            ; While Tx need bytes
                                                                    ; try to depacketize num
                                                                    ; bytes required
        DepktResult = depacketize (nDataCDta- >depktDta, *outWorkBuf, BytesPending)
        DepktFlags = DepktResult >> 16                              ; save error flag
        BytesPending = DepktResult & 0xffff                         ; num bytes still pending
        if (BytesReqTx - BytesPending)                              ; Do we have any data?
                                                                    ; Yes, Transmit to modulator
            Copy2ModemTxBuff((BytesReqTx - BytesPending),
                    nDataCDta- >ModemTxPtr, V32Dta- >outWorkBufPtr)
        endif
        BytesReqTx = BytesPending                                   ; We still need this many
                                                                    ; Check packet error
        if (DepktFlags & #DPKT_BAD_FCS_BIT)                         ; Bad packet FCS received?
            RDSEvent(#EV_V32_WARNING, V32_DPKT_BAD_FCS)             ; report it
        endif
        if (DepktFlags & #DPKT_BAD_OPCODE_BIT)                      ; HS data not dQed?
                                                                    ; Get the message
            QDescriptor = GetQ(nDataDtaPtr->NetRxQRd, V32Dta->tmpBufPtr)
            Message = QDescriptor & #Q_OPCODE_MASK
            if (Message == #V32_DATA_END_MSG)                       ; End HS modulation
                ModemControl(nDataCDta->ModemTxPtr, #MC_OP_STOP_MODULATION)
                nDataCDta->ProtoFlag = V32_DATA_STATE_END_MSG
                BytesPending = 0                                    ; Break the while
                retVal = V32_STOP_MODULATOR                         ;    state DataRxOnly
            elseif (nessage == V32_SW_TO_VOICE)                     ;
                nDataCDta->ProtoFlag = V32_DATA_STATE_SW_TO_VOICE
                retVal = V32_MODULATDR_RX_SW                        ;    state switchTOvoice
            else                                                    ; Other opcodes punted
                RDSEvent(#EV_V32_WARNING,V32_UNEXPECTED_MSG, Message) ; Raise alarm
            endif
        elseif (DepktFlags & #DPKT_Q_EMPTY_OR_ERROR_BIT)
            nDataCDta->ProtoFlag = V32_DATA_STATE_UNDERFLOW
```

```
            RDSEvent(#EV_V32_ERROR, V32_DEPKT_QFAIL)         ; report it
            BytesPending = 0                                  ; Break the while
        endif
    endwhile
    return(retVal)
```

The V32InfoSend function sends the V32_MODEM_INFO_MSG message to the remote end. For now this message contains the system identification, the mode of operation (V32_CALLER, V32_ANSWER) and the current packet size used.

The pseudo code for this function follows:

```
void V32InfoSend (V32Dta, nDataCDta)
    V32Dta->tmpBufPtr[0] = V32Dta->Mode              ; put mode in message
    V32Dta->tmpBufPtr[1] = V32Dta->PktSize           ; put Pkt size in msg
    V32Dta->tmpBufPtr[2] = V32_VERSION               ; put version id in msg
    PutQ(nDataCDta->NetTxQWrite,                     ; Send end msg Msg
        (#V32_MODEM_INFO_MSG | #Q_REP_COUNT_3), sizeof(V32CapDta),
        &V32Dta->tmpBufPtr)
    return
```

The V32InfoExtract function extracts the modem information from the V32_MODEM_INFO message. It select the smallest packet size between the two ends, verifies the remote end mode and memories the system identification. If both modes are the same this indicates a problem and we stop the call. The pseudo code for this function follows:

```
retVal V32InfoExtract(V32Dta, V32CapDta)
    retVal = V32_MODE_OK
    if  (V32Dta->mode != V32CapDta->mode)
        retval = V32_INCOMPATIBLE_MODE
    else
        if  (V32Dta->PktSize < V32CapDta->Pktsize)
            V32Dta->PktSize = V32CapDta->PktSize
        endif
        V32Dta->RemVersion = V32CapDta->RemVersion
    endif
    return (retVal)
```

The V32IsEnergy function looks for the presence of energy at the modem receiver. It returns zero if energy is not present and returns a value different of zero when energy is present.

The pseudo code for this function follows:

```
retval V32IsEnergy(nDataCDta)

return (ModemControl(nDataCDta->ModemRxPtr,MC_OP_STA-
        TUS_REQ, MC_Pl_RX_MSE))
```

The V32CompPktSize function computes the packet size table. The packet size table has memory reserved by the nDatav32Init function and both databases (V32Dta, nDataCDta) hold a pointer to this memory.

The pseudo code for this function follows:

```
void V32CompPktSize(V32Dta, nDataCDta)
    index = 0
    repeat
        V32Dta->PkTsizeTbl[index] = (V32Dta->PktSize/16) * (index*800bps)
        index+
    until (index = nDataCDta->ModemMaxRate)
    return
```

The nData real time task init function calls the protocol specific function (nDataV32Init) when the nData task real time task becomes enabled (switch from voice). The function of this task is to initialize all the modules, structures and variables not initialized by the nData real time init function. Its main function is to initialize the database of the protocol and allocate the memory for the required buffers. It also selects the appropriate state to run and configures the software modem depending on the mode requested (caller or answerer). It also initialize the entry in the modem and common databases and configures the rate controller to its default. At this point the rate controller, the software modem transmitter and receiver have been turned off.

The pseudo code for this initializing function is as follows:

```
void nDataV32Init (nDataCDta *Ptr)                        ;
    V32Dta *V32DtaPtr                                     ; local Dbase pointer
    void        *PtrMemBlock
    RDSEvent(#INIT_V32)                                   ; Event report V32 init
    V32DtaPtr = nDataCDta->ProtoDB = PtrMemBlock          ; get pointer to our Dbase
    PtrMemBlock = nDataCDta->ProtoMem                     ; and our memory block
    V32DtaPtr->tmpBufPtr = PtrMemBlock                    ; allocate mem require by tmpbuffer
    V32DtaPtr->outWorkBufPtr = (PtrMemBLock + Nbytes)     ; allocate mem for buffer
                                                          ; between the packetizer and
                                                          ; copy2modemTxBuff
                                                          ; allocate mem for pkt size tbl
    V32DtaPtr->PktSizeTbl = (PtrMemBlock + NBytes + nDataCDta->ModemMaxRate)
    V32CompPktSize(V32DtaPtr, nDataCDta)                  ; initialize the packet size table
                                                          ; initialize the modem database
    V32DtaPtr->DataMsgTx = FALSE
    V32DtaPtr->FlagMsgRx = FALSE
    V32DtaPtr->MaskR = 0
    V32DtaPtr->E = 0
    V32DtaPtr->Finspeed = 0
    V32DtaPtr->FinMode = 0
    V32DtaPtr->RoundTrip = 0
    Ptr.NumTimers = 3                                     ; three timers will be used
                                                          ; initialize rate sequence mask
    Switch(nDataCDta->ModemMaxRate)
        case 6:                                           ; case 4800 bps
        Default:                                          ; or default
            V32DtaPtr->V32RateMask = 0xF5EF               ; V32 clear B4,B6,B8
            V32DtaPtr->V32bRateMask = 0xFD97              ; V32 bis clear B6,B9,B10,B12
            break
        case 9:                                           ; case 7200 bps
            V32DtaPtr->V32RateMask = 0xF5EF               ; V32 clear B4,B6,B8
            V32DtaPtr->V32bRateMask = 0xFDD7              ; clear B6,B10,B12
            break
        case 12:                                          ; case 9600 bps
            V32DtaPtr->V32RateMask = 0xFEFF               ; V32 clear B4
            V32DtaPtr->V32bRateMask = 0xFFD7              ; clear B10,B12
            break
        case 15:                                          ; case 12000 bps
            V32DtaPtr->V32RateMask = 0xFEFF               ; V32 clear B4
            V32DtaPtr->V32bRateMask = 0xFFF7              ; clear B12
            break
        case 18:                                          ; case 14400 bps
            V32DtaPtr->V32RateMask = 0xFEFF               ; V32 clear B4
            V32DtaPtr->V32bRateMask = 0xFFFF              ; dont clear any bits
            break                                         ; everything supported
    endswitch
                                                          ; Initialize the State Machine FSA
    nDataCDta->ProtocolCode = &V32ModemRelay              ; Upper Layer State Machine
    V32DtaPtr->NbParams = 2                               ; 2 arguments are used
    V32DtaPtr->param_1 = nDataCDta                        ; init state machine 1st parameter
    V32DtaPtr->param_2 = V32DtaPtr                        ; init state machine 2nd parameter
    nDataModemControl(nDataCDta->stream, 1,1)             ; V32 needs both TX and RX enable
    ModemCfgFail = FALSE                                  ; reset modem cfg failure flag
    switch(nDataCDta->SwitchToData)                       ; Reason of switching
        case SWITCH_V32_AA_DET:                           ; AA detected
        case SWITCH_V32_AC_TRSIG:                         ; or TRSIG AC
                                                          ; cfg smodem rx and tx
            if (!ModemControl(nDataCDta->ModemRxPtr,
                MC_OP_CONFIG_MDM_RX, MC_P1_PROTO_V32, MC_P2_V32_ANS))
                RDSEvent(#EV_V32_ERROR, #V32_MODEM_CFG_FAILED, nDataCDta->stream,
                MC_OP_CONFIG_MDM_RX, #V32_ANSWER)         ; report error
                ModemCfgFail = TRUE                       ; set error flag
            endif
            if (!ModemControl(nDataCDta->ModemTxPtr,
                MC_OP_CONFIG_MDM_TX, MC_P1_PROTO_V32, MC_P2_V32_ANS))
                RDSEvent(#EV_V32_ERROR, #V32_MODEM_CFG_FAILED, nDataCDta->stream,
                MC_OP_CONFIG_MDM_TX, #V32_ANSWER)         ; report error
                ModemCfgFail = TRUE                       ; set error flag
            endif
            V32DtaPtr->Mode = V32_ANSWER                  ; set mode
            InitFSA(V32DtaPtr->CurrentState, &V32AnsWaitAADet)   ; init 1st state to
                                                          ; run and execute it's init routine
        case SWITCH_V32_AC_DET:                           ; AC detected
        case SWITCH_V32_AA_TRSIG:                         ; or TRSIG AA
                                                          ; cfg smodem rx and tx
```

-continued

```
        if (!ModemControl(nDataCDta->ModemRxPtr,
            MC_OP_CONFIG_MDM_RX, MC_P1_PROTO_V32, MC_P2_V32_CALL))
            RDSEvent(#EV_V32_ERROR, #V32_MODEM_CFG_FAILED, nDataCDta->stream,
            MC_OP_CONFIG_MDM_RX, #V32_CALLER)    ; report error
            ModemCfgFail = TRUE                  ; set error flag
        endif
        if (!ModemControl(nDataCDta->ModemTxPtr,
            MC_OP_CONFIG_MDM_TX, MC_P1_PROTO_V32, MC_P2_V32_CALL))
            RDSEvent(#EV_V32_ERROR, #V32_MODEM_CFG_FAILED, nDataCDta->stream,
            MC_OP_CONFIG_MDM_TX, #V32_CALLER)    ; report error
            ModemCfgFail = TRUE                  ; set error flag
        endif
        V32DtaPtr->Mode = V32_CALLER             ; set mode
        InitFSA(V32DtaPtr->CurrentState, &V32CallWaitACDet)    ; init 1st state to run
                                                 ; and execute it's init routine
    endswitch
    if (ModemCfgFail)
        V32DtaPtr->CurrentState = V32Sw2Voice    ; go to switch to voice
        RDSEvent(#V32_PROTOCOL_INIT_FAILED)      ; report error
    else
                                                 ; Start the modulation
        ModemControl(nDataCDta->ModemTxPtr, MC_OP_START_MODULATION)
                                                 ; config network with default
        nDataRateConfig(nDataCDta->Stream, nDataCDta->ModemMaxRate)
        RDSEvent(#V32_PROTOCOL_INIT)
    endif
return
```

There is no indication in the V.32 ITU specification on how termination should be achieved. For now we simply detect that we have lost the carrier detection from the software modem receiver and request a transition to the transmitter state only or a switch back to voice.

For each nData stream supporting the V.32 bis modem relay, a structure of type V32bDta and nDataDta must exist. A single FSA state table can support multiple V.32 bis state machines as long as the controlling task saves the state context for each state machine.

```
FUNCTION:  nDataV32Init
nDataV32Init- V.32 bis modem relay initialization function
SYNOPSIS:
    void nDataV32Init(nDataDta *nDataDtaPtr, void *PtrMemBlock)
    RTcall ,nDataV32Init ret:void, ar2:nDataDta, ar3:PtrMemBlock
ARGUMENTS:
    ar2     nDataDta      nData stream common database.
    ar3     PtrMemBlock   pointer to the allocated memory block.
RETURN VALUE:
    void
DESCRIPTION:
    Provides all initialization of the V.32 bis modem relay state machine required   on a
switch to V.32 protocol.
CALLIING CONVENTION:
    "C" & RT standard
WORDCOUNT:   ?
CYCLE COUNT:  ?
```

The following glossary defines some of the terms used in the foregoing description.

AA V.32 AA sequence corresponding to the signal state AAAA ... AA. It is also corresponding to a 1800 Hz tone.

AC V.32 AC sequence corresponding to the signal state ACAC ... AC. It is also corresponding to 600 and 3000 Hz tones AC1 V.32 AC sequence corresponding to the signal state ACAC ... AC. It is also corresponding to 600 and 3000 Hz tones with phase inverted relative to the CA sequence ANS 2100 Hz ITU answer tone with optional phase reversals at 450 msec intervals B1 V.32 B1 sequence corresponding to scrambled modulated one bps Bits per second C5x A Texas Instruments TMS320C51 digital signal processor CA V.32 CA sequence corresponding to the signal state CACA ... CA. It is also corresponding to 600 and 3000 Hz tones with phase inverted relative to the AC sequence CC V.32 CC sequence corresponding to the signal state CCCC ... CC. It is also corresponding to a 1800 Hz tone with phase inverted relative to the AA sequence E V.32 E sequence corresponding to a 16 bits sequence marking the end of rate sequence R2 and R3

FSA Finite State Automaton

FCS Frame Check Sequence

HS High Speed Data

MT Round trip delay observed from the Answer Modem

NL Network Layer

NOTE Optional echo canceller trainning sequence

NT Round trip delay observed from the Call Modem

Protocol A formal set of rules governing the establishment and orderly conduct of communications between two systems sharing a common interface.

R1 V.32 R1 sequence corresponding to a 16 bits rate information used by Modems to exchange their capabilities R2 V.32 R2 sequence corresponding to a 16 bits rate information used by Modems to exchange their capabilities R3 V.32 R3 sequence corresponding to a 16 bits rate information used by Modems to exchange their capabilities p0 RT Round trip delay S V.32 S sequence corresponding to the signal state ABAB . . . AB S1 V.32 second S sequence corresponding to the signal state ABAB . . . AB SN V.32 !S sequence corresponding to the signal state CDCD . . . CD SN1 V.32 second !S sequence corresponding to the signal state CDCD . . . CD TRN V.32 TRN sequence corresponding to scrambled ones at 4800 bps with dibits encoded directly from states A,B,C,D TRSIG Transitional Signalling V.32 ITU . Recommendation for 4800 and 9600 bps Modems.

V.32 Bis ITU . Recommendation for 4800–14400 bps Modems.

VA Voice Application. A Voice Application is the combination of the Voice Kernel and core application. Example of core application are HCV, LDCELP, ACELP, V.17, V.32 etc . . .

VK Voice Kernel. A generic DSP voice handling module. This module is configurable by SMP messages.

While a specific embodiment of the invention has been illustrated and described it will be apparent to one skilled in the art that numerous variations and/or alterations can be made to the basic concept. It is to be understood that such variations and alterations will fall within the scope of the invention as defined by the appended claims.

I claim:

1. In a communications network for full duplex transport of voiceband data between end point terminals over a communication channel that employs a transmission means at each end thereof for transmitting voiceband data signals via a demodulation/modulation protocol, a relay system, associated with each transmission means, including a modem relay for exchanging parameter information with the end point terminal associated therewith upon detection of the initiation of a voiceband data call, for relaying said parameter information to a counterpart modem relay and for receiving parameter information from said counterpart modem relay with respect to the end point terminal associated with said counterpart modem to thereby emulate a communication channel between said end point terminals, for the purpose of negotiating compatible data transmission conditions therebetween.

2. A relay system as defined in claim 1 wherein each of said end point terminals has a modem.

3. A relay system as defined in claim 2 wherein said parameter information includes round trip delay calculations for use in configuring system echo cancellers.

4. A relay system as defined in claim 2 wherein said parameter information includes round trip delay calculations for use in evaluating local loop characteristics.

5. A relay system as defined in claim 2 wherein said parameter information includes supported data rates.

6. A relay system as defined in claim 2 wherein said parameter information includes supported modulation types.

7. A relay system as defined in claim 2 wherein said parameter information includes supported encoding algorithms.

8. A relay system as defined in claim 1 for use in a communications network to selectively carrying data and voice signals between end point terminals, said network having detection means to detect protocol exchange commands from one of said end point terminals representing a switch from voice signals to data signals.

9. A method of communicating voiceband data from a near end modem to a far end modem over a voice compressed communications channel that employs a transmission means at each end thereof for transmitting voiceband data signals via a demodulation/modulation protocol, said method comprising: providing a modem relay associated with each said transmission means and in communication with and separated from an associated end modem coupled to its associated transmission means; configuring each said modem relay to exchange parameter information with its associated end modem and; configuring each said modem relay to relay said parameter information to its counterpart modem relay in order to negotiate compatible data transmission conditions between said near end modem and said far end modem in full duplex communication.

10. A method as defined in claim 9 wherein said voice compressed communications channel is carried over the public switched telephone network (PSTN).

11. A system for negotiating data transmission parameters between end system modems connected through a voiceband communications channel that employs a transmission means associated with an end system modem at each end thereof for transmitting voiceband data signals via a demodulation/modulation protocol, said system having a modem relay associated with each said transmission means and with the end system modem associated with the associated transmission means, each modem relay being configured to exchange transmission parameter information with its associated end system modem and with its counterpart modem relay associated with the opposite end system modem upon detection of an initiation of a data call, and wherein said modem relays compare said exchanged transmission parameters to establish common characteristics for full duplex data communication between said end system modems.

12. A system as defined in claim 11 wherein said transmission parameter information includes return delay times between each modem relay and end system modems associated therewith and between each modem relay for use in configuring system echo cancellers.

13. A system as defined in claim 11 wherein said transmission parameter information includes data rates supported by access links between end system modems and associated modems and between relay modems.

14. A system as defined in claim 13 wherein said relay modems modify supported data rates in respective access loops to establish a common supported data rate.

15. A system as defined in claim 11 wherein said relay modems are associated with Private Branch Exchange (PBX) control systems.

16. A system as defined in claim 11 wherein said relay modem detects a voiceband data call originating from one of said end systems modems and in response switches said voiceband communication channel from voice telephony service to a data transmission service.

17. A system as defined in claim 16 wherein said voiceband date call is originated by a computer or facsimile equipment.

* * * * *